United States Patent
Shi et al.

(10) Patent No.: US 9,866,250 B2
(45) Date of Patent: *Jan. 9, 2018

(54) ADAPTIVE MAXIMUM POWER LIMITING USING CAPACITIVE SENSING IN A WIRELESS DEVICE

(71) Applicant: Futurewei Technologies, Inc., Plano, TX (US)

(72) Inventors: Ping Shi, San Diego, CA (US); Jinchun Ge, San Diego, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/467,089

(22) Filed: Mar. 23, 2017

(65) Prior Publication Data
US 2017/0194996 A1 Jul. 6, 2017

Related U.S. Application Data

(63) Continuation of application No. 14/689,595, filed on Apr. 17, 2015, now Pat. No. 9,621,211, which is a
(Continued)

(51) Int. Cl.
*H04B 17/00* (2015.01)
*H04B 1/3827* (2015.01)
*H04W 52/18* (2009.01)

(52) U.S. Cl.
CPC .......... *H04B 1/3838* (2013.01); *H04W 52/18* (2013.01)

(58) Field of Classification Search
CPC ... H04B 1/3833; H04B 1/385; H04W 52/288; H04W 52/367
(Continued)

(56) References Cited

U.S. PATENT DOCUMENTS 6,204,839 B1 3/2001 Mato, Jr.
6,853,850 B2 2/2005 Shim et al.
(Continued)

FOREIGN PATENT DOCUMENTS

CN 101883413 A 11/2010
JP 11163616 A 6/1999
(Continued)

OTHER PUBLICATIONS

S. Myllymaki et al., "Capacitive Recognition of the User's Hand Grip Position in Mobile Handsets," Progress in Electromagnetics Research B, vol. 22, 203-220 (2010).
(Continued)

*Primary Examiner* — Raj Chakraborty
(74) *Attorney, Agent, or Firm* — Futurewei Technologies, Inc.

(57) ABSTRACT

An apparatus for satisfying Specific Absorption Rate (SAR) compliance criteria including a first capacitance sensor, a second capacitance sensor, a memory, and a processor. The memory is configured to store pre-established proximity regions that include a free space region of proximity based on baseline capacitance measurements obtained from the sensors when no human body is proximate a wireless device and a first region of proximity based on initial capacitance measurements obtained from the sensors when the human body is spaced apart from the wireless device by a first predetermined separation distance. The processor is configured to instruct a radio frequency (RF) transmitter to operate at a first output power when subsequent capacitance measurements received from the sensors are within the free space region of proximity and at a second output power, less than the first output power when the subsequent capacitance measurements are within the first region of proximity.

8 Claims, 14 Drawing Sheets

Related U.S. Application Data continuation of application No. 13/333,325, filed on Dec. 21, 2011, now Pat. No. 9,026,059.

(60) Provisional application No. 61/443,974, filed on Feb. 17, 2011.

(58) Field of Classification Search
USPC .................................................... 455/67.11
See application file for complete search history.

(56) References Cited

U.S. PATENT DOCUMENTS

| | | | |
|---|---|---|---|
| 7,622,921 | B2 | 11/2009 | Fontius et al. |
| 8,077,032 | B1 | 12/2011 | Vier et al. |
| 8,417,296 | B2* | 4/2013 | Caballero ............ H04B 1/3838 455/126 |
| 8,792,930 | B1 | 7/2014 | Gopalakrishnan et al. |
| 2003/0064761 | A1 | 4/2003 | Nevermann |
| 2003/0210203 | A1 | 11/2003 | Phillips et al. |
| 2004/0148515 | A1 | 7/2004 | Kikuchi |
| 2005/0124305 | A1 | 6/2005 | Stichelbout |
| 2008/0051165 | A1 | 2/2008 | Burgan et al. |
| 2008/0218183 | A1 | 9/2008 | Sato |
| 2009/0305742 | A1 | 12/2009 | Caballero et al. |
| 2010/0167783 | A1* | 7/2010 | Alameh ............... H04M 1/0202 455/556.1 |
| 2010/0279751 | A1 | 11/2010 | Pourseyed et al. |
| 2010/0317302 | A1* | 12/2010 | Greenwood ......... H01Q 1/2258 455/127.1 |
| 2011/0034135 | A1 | 2/2011 | Ali et al. |
| 2011/0222469 | A1 | 9/2011 | Ali et al. |
| 2011/0250903 | A1 | 10/2011 | Huang et al. |
| 2012/0021707 | A1* | 1/2012 | Forrester ............... H04W 52/30 455/103 |
| 2012/0052804 | A1 | 3/2012 | Wang |
| 2012/0069885 | A1 | 3/2012 | Chung et al. |
| 2012/0071195 | A1 | 3/2012 | Chakraborty et al. |
| 2012/0071203 | A1 | 3/2012 | Wong |
| 2012/0077538 | A1 | 3/2012 | Yun |
| 2012/0142291 | A1 | 6/2012 | Rath et al. |
| 2012/0190398 | A1 | 7/2012 | Leukkunen |
| 2012/0214412 | A1 | 8/2012 | Schlub et al. |
| 2015/0222312 | A1* | 8/2015 | Shi ....................... H04B 1/3838 455/127.1 |

FOREIGN PATENT DOCUMENTS

| | | |
|---|---|---|
| JP | 2002171191 A | 6/2002 |
| JP | 2005286627 A | 10/2005 |
| JP | 2012065321 A | 3/2012 |
| WO | 2009149023 A1 | 12/2009 |
| WO | 2010144620 A1 | 12/2010 |

OTHER PUBLICATIONS

"RF Exposure Procedures Update," FCC/OET Laboratory Division, TCB Workshop, 36 pages (Oct. 2010).

Pratt, S., "Capacitance Sensors for Human Interfaces to Electronic Equipment," Ask the Engineer, Analog Dialogue vol. 40 No. 4, Oct. 2006, pp. 6-8.

"AD7150 Capacitance Converter for Proximity Sensing," Analog Devices, www.analog,com/cdc, 2008, 2 pages.

"Interdigital Capacitor Design," Agilent EEsof EDA, Agilent Technologies, www.agilent.com/find/eesof, 2008, 10 pages.

"Fundamental of Electrostatic Discharge—Part Five-Device Sensitivity and Testing," ESD Association, Rome, NY, 2010, 7 pages.

Grothe, Holger, "AD7150 On-Chip Noise Filter," AN-1048 Application Note, Analog Devices, 2009, 2 pages.

"IEEE Standard for Safety Levels with Respect to Human Exposure to Radio Frequency Electromagnetic Fields, 3kHz 9 to 300 GHz," IEEE International Committee on Electromagnetic Safety (SCC39), IEEE Standard C95.1-2005, Apr. 19, 2006, 250 pages.

"IEEE Recommended Practice for Measurements and Computations of Radio Frequency Electromagnetic Fields with Respect to Human Exposure to Such Fields, 100 kHz-300 GHz," IEEE International Committee on Electromagnetic Safety, IEEE-SA Standards Board, IEEE Standard C95.3-2002 (R2008), Jun. 12, 2008, 133 pages.

* cited by examiner

ADAPTIVE MAXIMUM POWER LIMITING USING CAPACITIVE SENSING IN A WIRELESS DEVICE

CROSS-REFERENCE TO RELATED APPLICATIONS

This patent application is a continuation of U.S. patent application Ser. No. 14/689,595, filed Apr. 17, 2015, now allowed, which is a continuation of U.S. patent application Ser. No. 13/333,325, filed Dec. 21, 2011, which claims priority to U.S. Provisional Patent Application No. 61/443,974 filed Feb. 17, 2011, each of which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Advances in wireless communication have revolutionized the way we communicate and access information, and has birthed a plethora of wireless capable consumer devices whose affordability and availability have increased over time. Generally, wireless capable consumer devices may communicate with other wireless capable devices by exchanging radio frequency (RF) communication signals via a transceiver, which may be located internally or externally to the device. In many cases, transceiver output power directly impacts wireless performance, with higher transceiver output power limits allowing the wireless device to achieve greater throughput and/or broader wireless coverage (e.g., enhanced coverage areas).

However, RF transmissions may produce RF radiation, e.g., electromagnetic radiation in the frequency range of about three kilohertz (kHz) to about 300 Gigahertz (GHz), which may be harmful to humans at elevated exposure/absorption thresholds. Consequently, the Federal Communications Commission (FCC) has regulated the RF radiation output of various wireless devices to limit the general public's exposure to RF radiation. Some of the FCC's regulations and/or compliance standards may be outlined in Institute of Electrical and Electronics Engineers (IEEE)/American National Standards Institute (ANSI) publication C95.1-2005 entitled "IEEE Standard for Safety Levels with Respect to Human Exposure to Radio Frequency Electromagnetic Fields, 3 kHz to 300 GHz" and IEEE/ANSI C95.3-2002 entitled "IEEE Recommended Practice for Measurements and Computations of Radio Frequency Electromagnetic Fields With Respect to Human Exposure to Such Fields, 100 kHz-300 GHz", both of which are incorporated by reference herein as if reproduced in their entirety. Specifically, the FCC regulations specify maximum Specific Absorption Rates (SAR) for various RF devices based on different factors. SAR is defined as the rate of RF energy absorption per unit mass at a point in an absorbing body, and may be calculated by the formula:

$$SAR = \frac{\sigma \cdot E^2}{\rho},$$

where $\sigma$ is the conductivity of the tissue simulating material in Siemens per meter (S/m), E is the total root mean squared (RMS) electric field strength in volts per meter (V/m), and $\rho$ is the mass density of the tissue-simulating material in kilograms per cubic meter (kg/m$^3$). To comply with these regulations, some wireless terminal devices, e.g., universal serial bus (USB) data-cards, wireless routers, tablets, electronic readers (e-readers), phones, etc., must be submitted to a certified testing laboratory for SAR compliance evaluation.

RF radiation levels may be related to both transceiver output power and separation distance (i.e., the distance separating the human body and the RF radiation source), as well as other factors (e.g., shielding, antenna design, etc.). Specifically, the amount of RF radiation absorbed by a human body may increase when transceiver output power increases, as well as when the separation distance decreases. Consequently, one strategy for satisfying SAR compliance criteria may be to reduce transceiver output power to offset a reduction in separation distance (e.g., lowering output power as the human body approaches RF radiation source). For instance, some wireless devices (e.g., cell phones) may employ touch screen sensors to detect the presence of a human body. However, touch screen sensors may require direct human body contact, and therefore may be incapable of proximity detection (i.e., approximating the distance of the human body to the RF radiation source) and may be ill-suited for wireless devices. Alternatively, optical or infrared proximity detection may detect the presence (as well as approximate the separation distance) of an object using electromagnetic radiation (e.g., by bouncing RF waves or optical beams off the object). However, optical/infrared proximity detection may be incapable of differentiating between human bodies and inanimate objects (e.g., books, tables, etc.), and consequently may decrease wireless performance by frequently detecting false positives (i.e., by reducing transceiver output power when doing such is not necessary to satisfy SAR compliance criteria). For instance, optical/infrared proximity detection may trigger a decrease in transceiver output power upon detecting an inanimate object (e.g., table). As such, an improved method for accurately detecting the presence and proximity of a human body is desired to better optimize wireless performance while satisfying SAR compliance criteria.

SUMMARY

Disclosed herein is an apparatus for satisfying Specific Absorption Rate (SAR) compliance criteria including a first capacitance sensor, a second capacitance sensor, a memory operably coupled to the first capacitance sensor and the second capacitance sensor and storing pre-established proximity regions, wherein the pre-established proximity regions include a free space region of proximity based on baseline capacitance measurements obtained from the first capacitance sensor and the second capacitance sensor when no human body is proximate a wireless device and a first region of proximity based on initial capacitance measurements obtained from the first capacitance sensor and the second capacitance sensor when the human body is spaced apart from the wireless device by a first predetermined separation distance, and a processor operably coupled to the memory and configured to instruct a radio frequency (RF) transmitter to operate at a first output power limited by a first maximum power limit when subsequent capacitance measurements received from the first capacitance sensor and the second capacitance sensor are within the free space region of proximity and at a second output power limited by a second maximum power limit less than the first maximum power limit when the subsequent capacitance measurements received from the first capacitance sensor and the second capacitance sensor are within the first region of proximity.

Also disclosed herein is an apparatus for satisfying Specific Absorption Rate (SAR) compliance criteria including a first capacitance sensor, a second capacitance sensor, a memory operably coupled to the first capacitance sensor and the second capacitance sensor and storing pre-established proximity regions, wherein the pre-established proximity regions include a first region of proximity based on initial capacitance measurements obtained from the first capacitance sensor and the second capacitance sensor when spacing between a human body and a wireless device is within a first range of predetermined separation distances and a second region of proximity based on the initial capacitance measurements obtained from the first capacitance sensor and the second capacitance sensor when spacing between the human body and the wireless device within a second range of predetermined separation distances, and a processor operably coupled to the memory and configured to instruct a radio frequency (RF) transmitter to operate at a first output power limited by a first maximum power limit when subsequent capacitance measurements received from the first capacitance sensor and the second capacitance sensor are within the first region of proximity and at a second output power limited by a second maximum power limit different from the first maximum power limit when the subsequent capacitance measurements received from the first capacitance sensor and the second capacitance sensor are within the second region of proximity.

Also disclosed herein is a method for configuring a wireless device to satisfy Specific Absorption Rate (SAR) compliance criteria including receiving capacitance values from a first capacitance sensor and a second capacitance sensor, comparing the capacitance values to pre-established regions of proximity, wherein the pre-established regions of proximity are based on different separation distances between the wireless device and a human body and satisfy a Specific Absorption Rate (SAR), and adjusting an output power of a radio frequency (RF) transmitter based on the comparison of the capacitance values to the pre-established regions of proximity.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
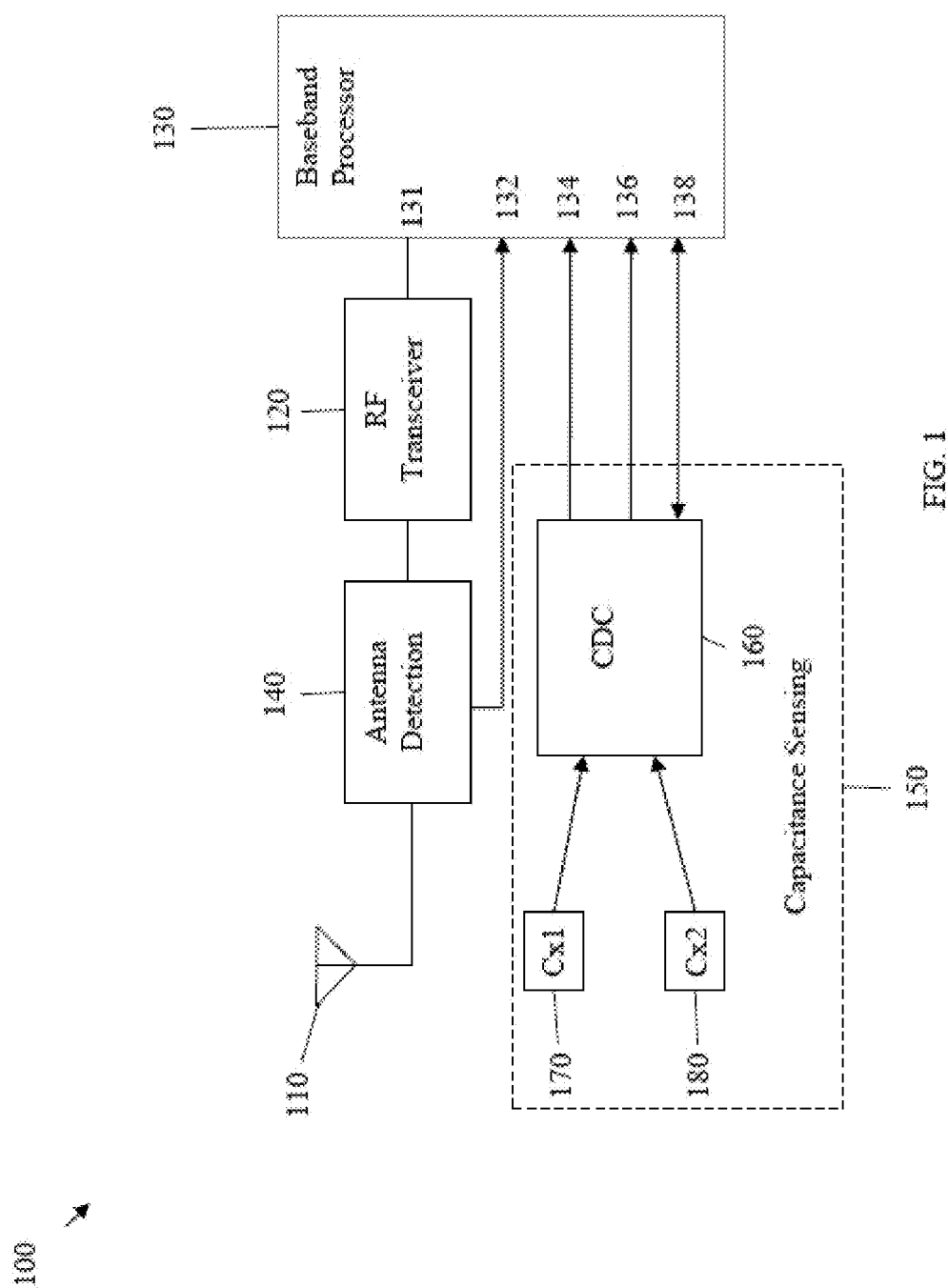
FIG. 1 illustrates a schematic diagram of an embodiment of a wireless device configured to perform proximity detection.

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein is an apparatus and method for determining the relative proximity of a human body in relation to a wireless device. Specifically, the apparatus may be configured to identify when a human body enters a region of proximity based on capacitance information derived from at least two strategically positioned capacitance sensors, and thereafter reduce the transceiver output power limit only to the level necessary to satisfy SAR compliance criteria for that proximity region. For instance, the method may determine that the human body is located in a particular proximity region (e.g., region 1, region 2, etc.), and adjust the transceiver output power limit to the level that satisfies SAR compliance criteria for substantially all or most separation distances falling within the proximity region. The wireless device is power-controlled and may not transmit at the preset max power limit. As such, aspects of this disclosure may allow a wireless device to optimize/improve wireless performance while satisfying SAR compliance criteria.

Capacitive sensing may be one method for reliably detecting the presence of a human body, and may be employed by positioning a capacitance sensor on or near the RF radiation source of a wireless device. Capacitance sensors may monitor variations in an electrostatic field around the electrodes of sensing capacitors to detect the presence and/or proximity of a human body in the vicinity of the RF radiation source. Specifically, capacitance sensors may distinguish between various objects based on their dielectric properties, which may allow capacitance sensors to differentiate human tissue from inanimate objects (e.g., books, table, etc.) based on the human body's unique dielectric constant ($\in$r). Wireless devices deploying a single capacitance sensor may accurately detect the presence (or absence) of a human body within a given proximity of the sensing capacitors thus the proximity information to the wireless devices, but may be unable to accurately approximate the separation distance between the human body and the device embedding sensing capacitors, e.g., may be unable to distinguish between a human body having a separation distance of 20 millimeters (mm) and 10 mm. Additionally, wireless devices deploying a single capacitance sensor may be unable to determine that a human body is in the proximity of a specific face of the wireless device, and may be unable to distinguish between a human body proximately located to a face comprising an antenna or a face located far from the antenna. As such, wireless devices deploying a single capacitance sensor may operate at a maximum output power limit when no human body is proximately located to the wireless device or a worst case output power limit when a human body is proximately located to the wireless device. For instance, cells phones may dynamically adjust their transceiver output power such that the effective RF exposure never exceeds 1.6 watts per kilogram (W/kg), which is the SAR exposure level as set by the FCC. A cell phone employing a single capacitance sensor may accomplish this by reducing transceiver output power limit to a minimum level (e.g., a level satisfying a worst case separation distance of about 5 mm or less) upon detecting the presence of a human body. As such, wireless performance may suffer in situations where an intermediate output power limit would satisfy SAR compliance criteria (e.g., when a human body is located to a face that does not comprise an antenna).

FIG. 1 illustrates an embodiment of a schematic diagram of a wireless device 100 configured to detect the presence and proximity of a human body to an RF radiation source. The wireless device 100 may be any device configured to communicate wirelessly, and may comprise an antenna 110, an RF transceiver 120, a baseband processor 130, an antenna detection module 140, and a capacitance sensing module 150 arranged as shown in FIG. 1. The antenna 110 may be any device or circuit that converts electrical signals into RF signals (and vice-versa). The RF transceiver 120 may be any device or circuit that works in conjunction with the antenna 110 to produce an RF signal and/or establish a wireless connection. For instance, the RF transceiver 120 may supply an RF alternating circuit (AC) signal to terminals of the antenna 110, thereby causing the antenna 110 to transmit an RF signal. Wireless performance may correspond to the throughput capacity and/or coverage range of the RF signal, and may be at least somewhat dependent on the output power of the RF transceiver 120.

The baseband processor 130 may be any device configured to control or vary the output power of the RF transceiver 120 based on proximity information. For instance, the baseband processor 130 may be configured to adjust the output power of the RF transceiver 120 to a level that satisfies SAR compliance criteria for a determined proximity. The baseband processor may comprise a port 131, a first general purpose input/output port (GPIO_N1) 132, a second general purpose input/output port (GPIO_N2) 134, a third general purpose input/output port (GPIO_N3) 136, and a data bus port 138. The first port 131 may be any port used to control or interact with the RF transceiver 120. The GPIO_N1 132, the GPIO_N2 134, and the GPIO_N3 136 may be any port configured to receive an interrupt signal. The data bus 138 may be any port (or pair of ports) configured to communicate with the capacitance sensing module 150. For example, the data bus 138 can be an I2C bus, SPI bus or any other data communication bus, serial or parallel. In an embodiment, the first port 131 may be connected to the RF transceiver 120, the GPIO_N1 132 may be coupled to the antenna detection module 140, and each of the GPIO_N2 134, the GPIO_N3 136, and the I2C bus 138 may be coupled to the capacitance sensing module 150. The antenna detection module 140 may be any device that is configured to determine when the antenna 110 is emitting RF radiation (e.g., transmitting an RF signal), and, if so, communicate an interrupt to the baseband processor 130 via the GPIO_N1 132.

The capacitance sensing module 150 may be any device capable of measuring capacitance data corresponding to proximity information and communicating the capacitance information to the baseband processor 130. The capacitance sensing module 150 may comprise a first capacitance sensor (Cx1) 170, a second capacitance sensor (Cx2) 180, and a capacitance-to-digital converter (CDC) 160 arranged as shown in FIG. 1. The Cx1 170 and the Cx2 180 may be any components capable of measuring a capacitance, and may be positioned at different places on the wireless device 100. In an embodiment, the Cx1 170 and the Cx2 180 may be configured to generate an electrostatic field and facilitate the measurement of a capacitance value for the specific configuration of electrodes between electrodes. The CDC 160 may be any component configured to measure the capacitance perceived from the Cx1 170 and the Cx2 180, convert the measured capacitance into a digital signal, and forward the digital signal to the baseband processor 130 via the data bus 138. Additionally, the CDC 160 may be configured to send one or more interrupts to the baseband processor 130 via the GPIO_N2 134 or GPIO_N3 136 upon capacitance change meeting an interrupt condition. In an embodiment, the interrupt condition may correspond to a fluctuation in the capacitance measurements received from the Cx1 170 and/or Cx2 180, which may be indicative of a proximity change. In other embodiments, the interrupt condition may correspond to a threshold capacitance value. In any event, the baseband processor 130 may make an updated proximity determination upon receiving the interrupt, and (if necessary) adjust the RF transceiver's 120 output power pursuant thereto.

Figure 2:
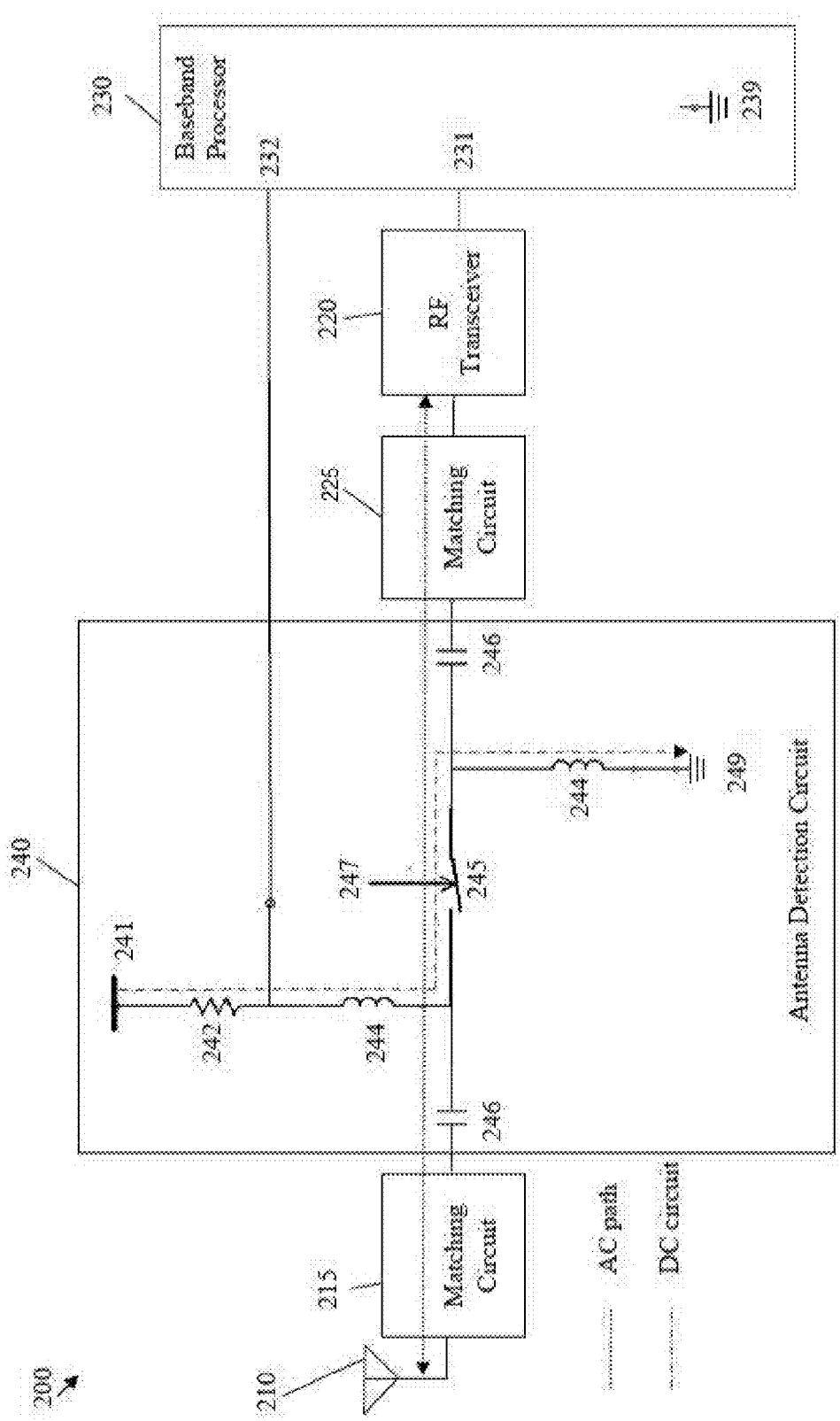
FIG. 2 illustrates a circuit diagram of an embodiment for implementing antenna detection.

FIG. 2 illustrates an embodiment of a circuit 200 that could be used for implementing antenna status detection. The circuit diagram 200 may comprise an antenna 210, an antenna matching circuit 215, an RF transceiver 220, a network matching circuit 225, and an antenna detection module 240 arranged as shown in FIG. 2. The antenna 210 may be configured similarly to the antenna 120 discussed above, and may be coupled to the antenna detection module 240 via the antenna matching circuit 215. The antenna matching circuit 215 may be any component or circuit configured to improve the transfer efficiency of an electrical signal traveling between the antenna detection module 240 and the antenna 210, e.g., through impedance matching. The RF transceiver 220 may be configured similarly to RF transceiver 120 discussed above, and may be coupled to the antenna detection module 140 via the network matching circuit 225. The network matching circuit 225 may be any component or circuit configured to improve the transfer efficiency of an electrical signal traveling between the antenna detection module 240 and the RF transceiver 220, e.g., through impedance matching. The baseband processor 230 may be configured similarly to the baseband processor 130, and may comprise a port 231, a GPIO_N1 232, and a ground 239 arranged as shown in FIG. 2. The port 231 and the GPIO_N1 232 may be configured similarly to the port 131 and the GPIO_N1 132 discussed above, and the ground 239 may represent a common reference point from which voltage potentials are measured in the baseband processor 230.

The antenna detection module 240 may be any component configured to determine whether the antenna 210 is emitting RF radiation. The antenna detection module 240 may be configured similarly to the antenna detection module 140, and may comprise a DC voltage source 241, a resistor 242, a plurality of inductors 244, an RF switch connector 245, a plurality of capacitors 246, an RF plug 247, and a ground 249 arranged as shown in FIG. 2. The DC voltage source 241 may be any component or port configured to supply steady power (e.g., a constant DC voltage) to the antenna detection circuit 240. The ground 249 may be any common reference point from which voltage potentials are measured in the antenna detection circuit 240, and may share a common reference point with the ground 239. The resistor 242 may be any component configured to provide electrical resistance in the antenna detection circuit 240. The inductors 244 may be any component configured to store energy in a magnetic field, and may serve to block/impede the flow of AC signals (e.g., RF AC signals) in the antenna detection module 240. For instance, the inductors 244 may isolate the DC circuit by preventing RF AC signals from migrating off of the AC path. The RF switch 245 may be any device configured to short or break an electrical circuit in the antenna detection module 240 upon actuation. In an embodiment, the RF switch 245 may be normally closed such that the RF switch connector 245 breaks the DC circuit upon actuation (e.g., by the RF plug 247). RF switch connector 245 may be a conventional switch that breaks both the AC path and the DC circuit upon actuation. The capacitors 246 may be any device used to store energy in an electric field, and may serve to block/impede the flow of DC signals in the antenna detection module 240. For instance, the capacitors 246 may isolate the AC path by preventing DC signals from migrating off of the DC circuit.

The RF plug 247 may be any component configured to engage and or actuate the RF switch 245 to break the DC circuit upon plugging. In other embodiments, RF switch 245 and RF plug 247 may not present but antenna has a ground pin besides the RF pins. Such antennas are common in wireless devices, for example PIFA antennas, IFA antennas, and loop antennas. A similar antenna detection can be implemented without RF switch 245 and RF plug 247. In such embodiment, inductor 244 will be removed, disconnecting the DC path to ground. Capacitor 246 will be bypassed or replaced with an 0 ohm resistor, and matching circuit 215 will be redesigned to allow a DC path to the RF pin of antenna (thus to ground).

Figure 3:
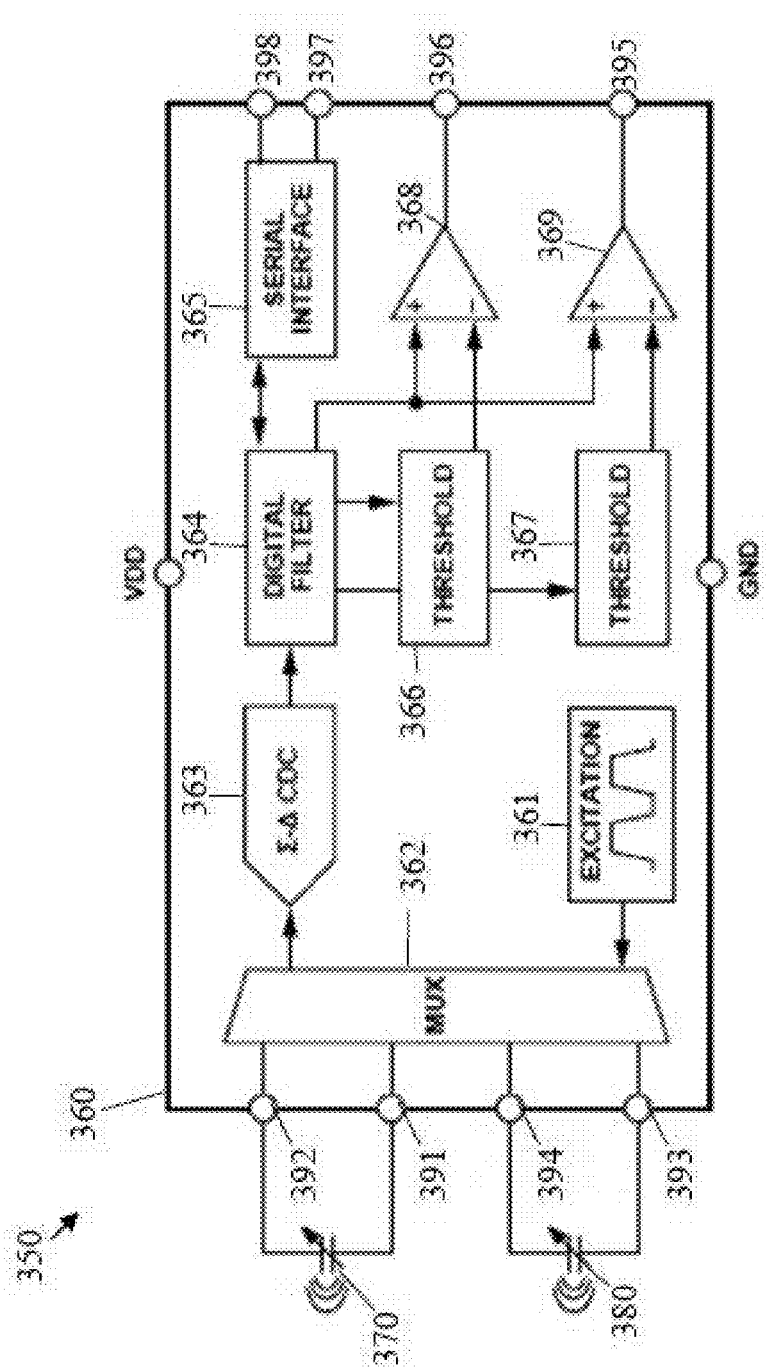
FIG. 3 illustrates a schematic diagram of an embodiment of a capacitance sensing module.

Further, the GPIO_N1 232 may be pulled high when the DC circuit is broken, and pulled low when the DC circuit is shorted (i.e., when the antenna 210 is not emitting RF radiation). Specifically, the capacitor's 246 DC resistance (Rcap), may be significantly greater than the resistor's 242 DC resistance (Rres), which may be significantly greater than the inductors' 244 combined DC resistance (Rind), e.g., Rind≈0<Rres<Rcap≈∞. Hence, the voltage supplied by the DC voltage source 241 may be primarily dissipated by the capacitor 246 (rather than the resistor 242) when the DC circuit is broken, thereby causing the GPIO_N1 232 to be pulled high. Likewise, the voltage supplied by the DC voltage source 241 may be primarily dissipated in the resistor 242 (rather than the inductors 244) when the DC circuit is shorted, thereby causing the GPIO_N1 232 to be pulled low. As such, the baseband processor 230 may receive an interrupt signal (e.g., a high voltage signal) over the GPIO_N1 232 when the antenna 210 is changing from in use to not in use, or vice versa. On receiving the interrupt over GPIO_N1 232, baseband processor 230 may poll the voltage of GPIO_N1 and determine whether antenna is in use (being able to radiate) or not. Base band processor 230 may also periodically check the voltage of GPIO_N1. FIG. 3 illustrates an embodiment of a capacitance sensing module 350, which may perform a similar task to the capacitance sensing module 150 discussed above. The capacitance sensing module 350 may comprise a CDC 360, a Cx1 370, a Cx2 380, which may be similar to the CDC 160, the Cx1 170, and the Cx2 180 discussed above. In an embodiment, the CDC 360 may be a commercially available component, such as the Analog Devices (AD) 7150 or the AD 7156 as described in AD publications AN-1048 entitled "AD7150 On-Chip Noise Filter," and PH07504-2-6/08(A) entitled "AD7150 Capacitance Converter for Proximity Sensing," both of which are incorporated herein by reference as if reproduced in their entireties.

The CDC 360 may comprise an excitation module 361, a multiplexer (MUX) 362, a direct interface to capacitance sensors (ΣΔ CDC) 363, a digital filter 364, a serial interface 365, a first threshold module 366, a second threshold module 367, a first comparator 368, a second comparator 369, and a plurality of ports 391-398 arranged as shown in FIG. 3. The excitation module 361 may be any component configured to facilitate the production of an electrostatic field for the purpose of proximity detection. For instance, the excitation module 361 may supply a voltage waveform to the Cx1 370 and the Cx2 380 via the ports 391 and 393, which may cause the Cx1 370 and the Cx2 380 to produce an electrostatic field. The MUX 362 may be any component configured to forward capacitance data from the Cx1 370 and/or the Cx2 380 to the ΣΔ CDC 363. Additionally, the MUX 362 may transfer the voltage waveform supplied by the excitation module 361 to the Cx1 370 and the Cx2 380 via the ports 391 and 393. The ΣΔ CDC 363 may be any component configured to convert one or more pF analog capacitance measurements supplied by the Cx1 370 and/or Cx2 380 into a digital signal (e.g., a discrete voltage signal), and send the digital signal to the digital filter 364. The digital filter 364 may be any component that is capable of improving the signal characteristics of a digital signal, e.g., through noise reduction, etc. In an embodiment, the digital filter 364 may be configured to filter the digital signal received from the ΣΔ CDC 363, and subsequently forward the filtered digital signal to the serial interface 365. In some embodiments, the digital filter 364 may also forward the filtered digital signal (or portions thereof relating to the individual capacitance measurements) to the first threshold module 366, the second threshold module 367, the first comparator 368, the second comparator 369, or combinations thereof.

The serial interface 365 may be any component configured to convert a parallel communications signal into a serial communications signal. In an embodiment, the CDC 360 may run off a common clock source, and hence the various components 361-369 may communicate with one another synchronously. However, data communicated over the ports 397-398 may be received by a component or module (e.g., the baseband processor 230) that does not share the same clock source. Hence, the serial interface 365 may be configured to send the data digital signal serially over the ports 397-398.

The threshold modules 366-367 may be any components configured to send a threshold or base signal to the comparators 368-369. The comparators 368-369 may be any component configured to send an interrupt signal over the ports 395-396 upon detecting an interrupt condition. In an embodiment, the comparators 368-369 may detect an interrupt condition by comparing the threshold signals received from the threshold modules 366-367 with the digital signal received from the digital filter 364. For instance, the threshold signal may correspond to a buffered digital signal that was previously received from the digital filter 364 (e.g., the threshold modules 367 may be buffers), and the comparators may be configured to send an interrupt when a difference between the threshold signals and the digital signal exceeds an interrupt threshold. Hence, the interrupt may indicate a substantial or significant fluctuation of the capacitance measurements taken by the Cx1 370 and/or Cx2 380. In some instances, the threshold signal may represent an average or moving average of the digital signal. Alternatively, the threshold signals may correspond to a human body's entrance into or emergence from a region of proximity (e.g., region 1, region 2, etc.). Although the description of FIG. 3 may relate to a specific CDC (e.g., the AD715x), those of ordinary skill in the art will understand that other CDC models/devices (e.g., other than the AD715x) may be implemented in conjunction with various novel aspects of this disclosure.

Figure 4:
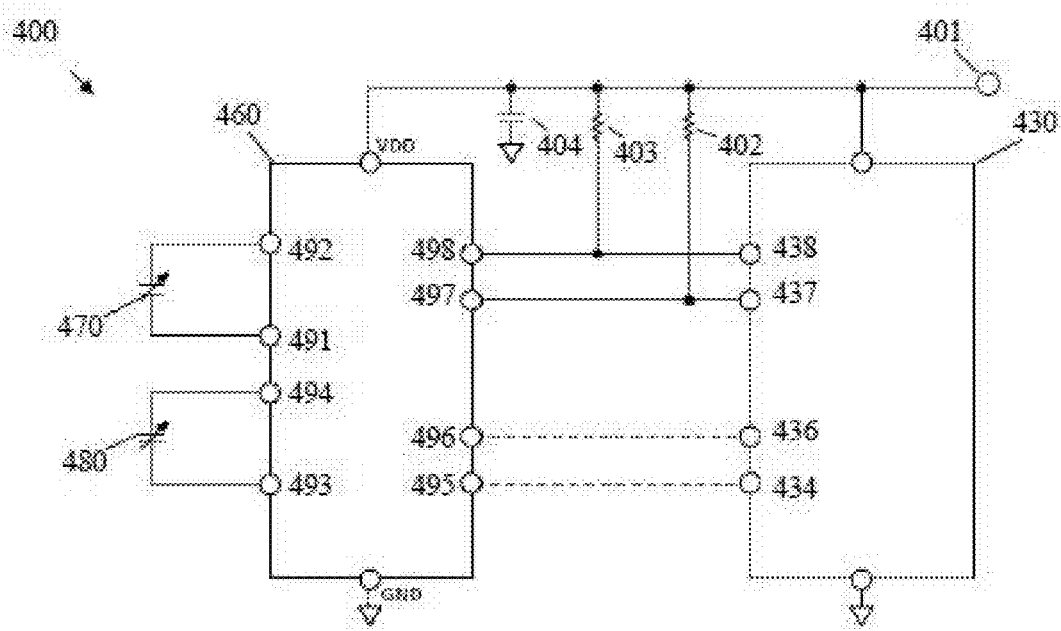
FIG. 4 illustrates a circuit diagram of an embodiment of a capacitance sensing interface for sensing and communicating proximity information.

FIG. 4 illustrates an embodiment of a capacitance sensing interface 400 for sensing and communicating proximity information to a processor 430. The capacitance sensing interface 400 may comprise a voltage supply 401, a microprocessor 430, a CDC 460, a Cx1 470, and a Cx2 480. The voltage supply 401 may be any component capable of supplying DC power to the microprocessor 430. For instance, the voltage supply may supply a DC voltage (VDD) of about 3.7 volts to the microprocessor 430 and the CDC 460. In an embodiment, the microprocessor 430 and the CDC 460 may share a common ground (GND) and DC power source, or may have different GNDs or DC power sources. The resistors 402-403 may be any circuit element or electrical component configured to provide electrical resistance in the capacitance sensing interface 400. The microprocessor 430, the CDC 460, the Cx1 470, and the Cx2 480 may be similar to the baseband processor 130, the CDC 160, the Cx1 170, and the Cx2 180 discussed above. The microprocessor 430 may comprise a plurality of ports 434-438 as shown in FIG. 4. The ports 434 and 436 may correspond to the GPIO_N2 134 and GPIO_N3 136 and may be used to receive interrupts from the CDC 460, while the ports 437-438 may correspond to the I2C bus port 138 and may be used to receive serial communication from the CDC 460.

The capacitance sensing module 460 may be configured to provide proximity information and/or interrupts to the microcontroller 430, and may comprise a plurality of ports 491-498 that are similar to the corresponding ports 391-398 of the CDC 360. Specifically, the ports 491, 493 may supply the Cx1 470 and the Cx2 480 with a voltage waveform that facilitates the production of an electrostatic field used for proximity detection, while the ports 492, 494 may measure capacitance from the Cx1 470 and the Cx2 480 that corresponds to fluctuations in the electrostatic field. The ports 495-496 may be used to send interrupts to the microprocessor 430 via ports 434, 436. The interrupt sent from the port 495 may be associated with the Cx1 470 and the interrupt sent from the port 496 may be associated with the Cx2 480. In an embodiment, the interrupts may be sent on the ports 495 and/or the port 496 when the capacitance measured by the Cx1 470 and/or Cx2 480 exceeds (or fails to exceed) a threshold, or otherwise falls outside of a window defined by two thresholds (e.g., a high and a low threshold). While the ports 497, 498 may be used to send a digital signal to the microprocessor 430 via the ports 437, 438. In an embodiment, the digital signal communicated over the ports 497, 498 may correspond to measured capacitance from the Cx1 470 and the Cx2 480, and may be used by the microprocessor 430 to make a proximity determination.

Figure 5:
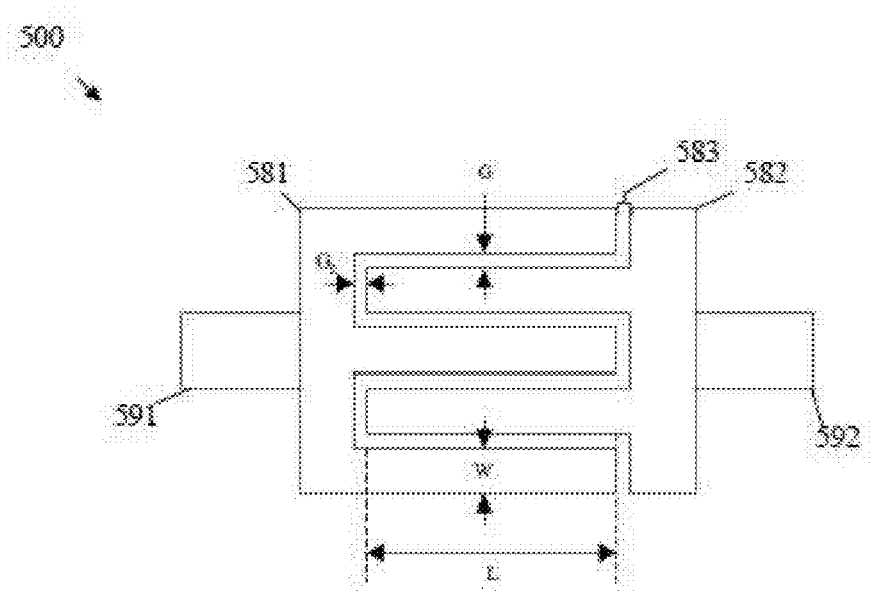
FIG. 5 illustrates a schematic diagram of an embodiment of a capacitance sensor.

FIG. 5 illustrates an embodiment of a capacitance sensor 500, which may perform similar functions to the Cx1 170 and Cx2 180 discussed above. The capacitance sensor 500 may comprise a first conductor 581, a second conductor 582, a dielectric insulator 583, an input port 591, and an output port 592 arranged as shown in FIG. 5. The first conductor 581 and the second conductor 582 may be composed of any electrically conductive material (e.g., copper, etc.), while the dielectric insulator 583 may be composed of any dielectric material (e.g., plastic, glass, mica, ceramic, air, etc.). In an embodiment, the capacitance sensor 500 may comprise an Interdigital Capacitor (IDC) whose first conductor 581 and second conductor 582 are fashioned similar to interlocking fingers, as described in the Agilent Electrical Engineering Software (EEsof) Electrical Design Automation publication entitled "Interdigital Capacitor Design," which is incorporated herein by reference as if reproduced in its entirety. As discussed therein, the performance of the capacitance sensor 500 may be related to various parameters, including the gap between fingers (G), the gap at the end of the fingers (GE), the length of the fingers (L), the width of the fingers (W), the dielectric constant of the substrate ($\in$r), the thickness (t) of the conductors 581-582, the resistivity ($\rho$) of the conductors 581-582, or combinations thereof. The input port 591 may be configured to receive an excitation signal (e.g., from an excitation module in a CDC), and the output port 592 may be configured to communicate capacitance data (e.g., to a CDC).

Figure 6:
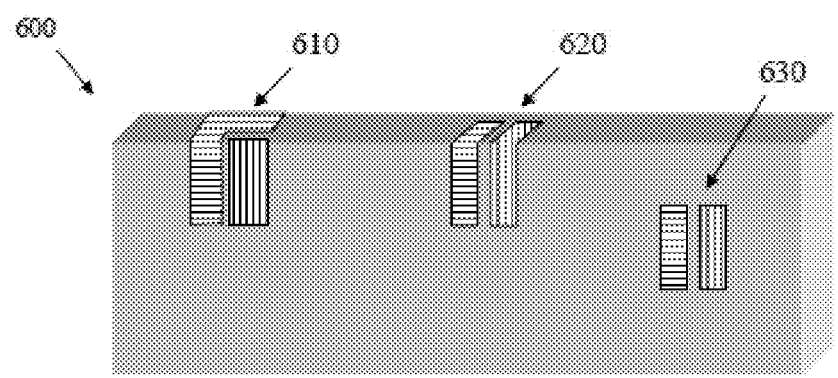
FIG. 6 illustrates a schematic diagram of an embodiment of a printed circuit board comprising a plurality of capacitance sensors.

In some embodiments, one or more capacitance sensors may be etched into a PCB layer or into a flexible PCB board. FIG. 6 illustrates an embodiment of a PCB layer 600 comprising a plurality of capacitance sensors 610, 620, and 630, which may be etched into the PCB layer 600 in various configurations. Additionally or alternatively, one or more of the capacitance sensors 610, 620, and 630 may exist and/or extend between multiple PCB layers. The flexible PCB can be wrapped around a device.

Figure 7:
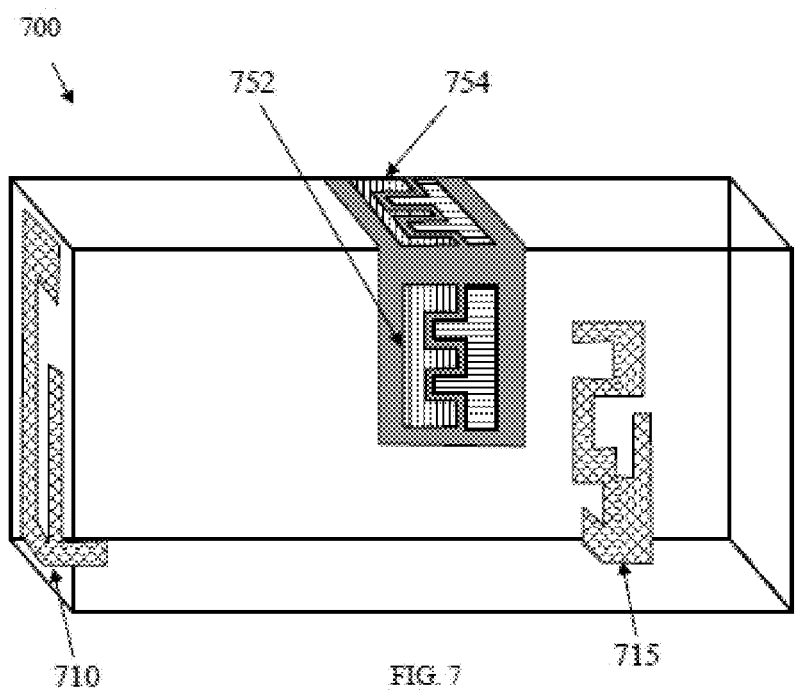
FIG. 7 illustrates a perspective view of another embodiment of a wireless device configured to perform proximity detection.

FIG. 7 illustrates a wireless device 700, which may be a data card or other wireless enabled device configured for proximity detection. The wireless device 700 may comprise a primary antenna 710, a secondary antenna 715, a Cx1 752, and a Cx2 754 arranged as shown in FIG. 7. The primary antenna 710 and/or the secondary antenna 720 may be similar to the antenna 110 discussed above, and may radiate RF signals for the purpose of establishing a wireless connection. The Cx1 752 and the Cx2 654 may be configured similarly to the Cx1 170 and the Cx2 180 discussed above, and may be configured to detect capacitance information corresponding to the wireless device 700. The Cx1 752 and the Cx2 754 may be strategically located on the wireless device 700 to allow the reasonably accurate and/or meaningful proximity detection. For instance, the positioning of the Cx1 752 and the Cx2 754 may provide relatively good proximity detection with respect to the left-hand face of the wireless device 700 comprising the primary antenna 710, while still allowing adequate proximity detection with respect to the front face of the wireless device comprising the secondary antenna 715.

In an embodiment, the Cx1 752 and the Cx2 754 may be calibrated according to baseline data gathered through laboratory testing. For instance, the capacitance of the Cx1 752 and/or the Cx2 754 may be measured and recorded for free space (i.e., when no human body is proximity located to the wireless device 700) to get a baseline capacitance reading. Subsequently, capacitance readings for the Cx1 752 and the Cx2 754 may be taken and recorded for known regions of proximity and/or known separation distances. e.g., specific distances (or ranges thereof) for which a given transceiver output power satisfies SAR compliance criteria. Accordingly, the device may operate at a maximum output power during free space conditions, a first output power limit (e.g., ¾ of the maximum output power limit) in a first proximity region, a second output power limit (e.g., ½ of the maximum output power limit) in a second proximity region, a third output power limit (e.g., ¼ of the maximum output power limit) in a third proximity region, and a minimum output power limit at a fourth proximity region (e.g., a worst case proximity region). Accordingly, the first proximity region may comprise separation distances for which the first output power limit does not produce RF exposure levels in excess of a predefined value. In such embodiments, the capacitance measurements may be used to determine when to step down or ramp up the RF transceiver's output power limit to optimize wireless performance while satisfying SAR compliance criteria.

Figure 8:
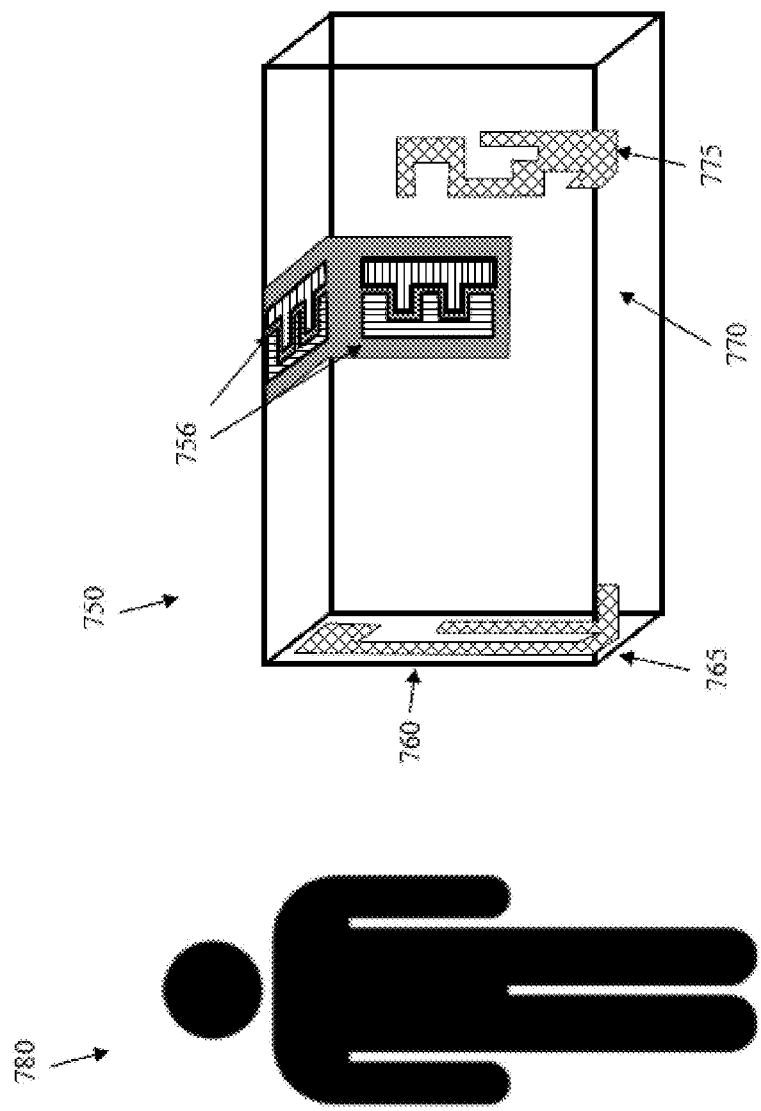
FIG. 8 illustrates a diagram of a wireless device in proximity to a human body.

FIG. 8 illustrates a wireless device 750 in proximity to a human body 780. The wireless device 750 may comprise a primary antenna 765 located on a first face 760 and a secondary antenna 775 located on a second face 770, as well as two or more capacitance sensors 756. In an embodiment, the primary antenna 765, the secondary antenna 775, and the capacitance sensors 756 may be configured similarly to the primary antenna 710, the secondary antenna 715, and the capacitance sensors 752/754 of the wireless device 700. As discussed herein, the capacitance sensors 756 which may be positioned strategically on the wireless device such that they may gather appropriate capacitance data, e.g., data that enables/facilitates a determination of the human body's 780 relative proximity to the first 760 and/or the second face 770.

Figure 9:
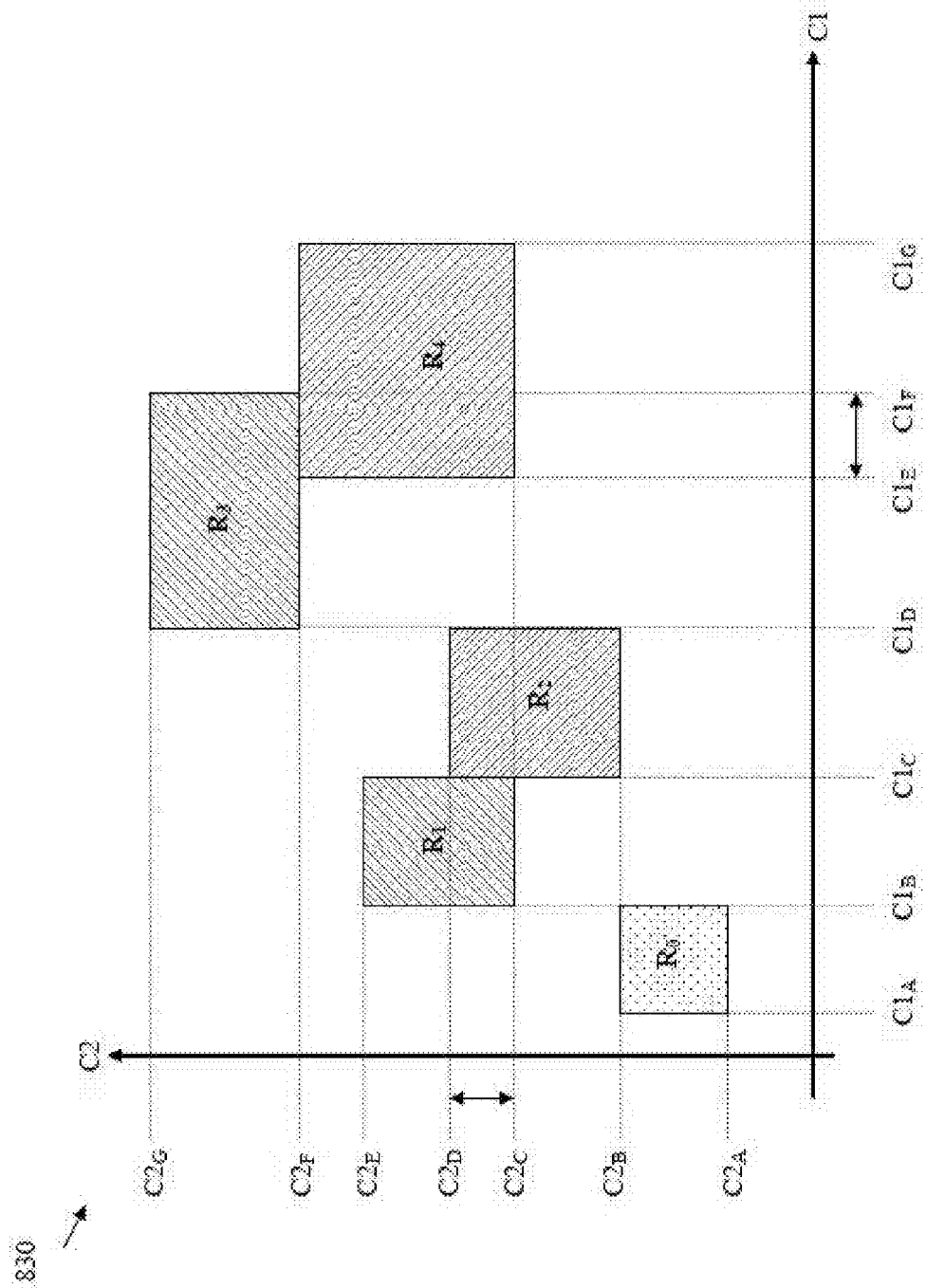
FIG. 9 illustrates a perspective view of another embodiment of a capacitance plane for classifying proximity regions.

FIG. 9 illustrates a capacitance plane 830 for determining and/or classifying proximity regions based on data gathered from a first capacitance sensor (C1) and a second capacitance sensor (C2). The C1 and C2 may be positioned at distributed locations on a wireless device, e.g., as demonstrated by the Cx1 752 and Cx2 754 of the wireless device 700. The capacitance plane 830 may comprise various regions of proximity, including a free space region of proximity (R0), a first region of proximity (R1), a second region of proximity (R2), a third region of proximity (R3), and a fourth region of proximity (R4) as shown in FIG. 9. In an embodiment, each of the proximity regions R0-R4 may be associated with a different output power (e.g., the highest output power level that satisfies SAR compliance criteria for each separation distance within the region of proximity). For instance, R0 may be associated with a maximum (MAX) output power limit (e.g., the highest output power limit for the RF transceiver), R1 may be associated with a first reduced output power limit (L1), R2 may be associated with a second reduced output power limit (L2), R3 may be associated with a third reduced output power limit (L3), and R4 may be associated with a minimum output power limit (MIN), where MAX>L1>L2>L3>MIN. Generally speaking, MAX may satisfy SAR compliance criteria for R0 (but not for R1-R4), L1 may satisfy SAR compliance criteria for R0 and R1 (but not for R2-R4), L2 may satisfy SAR compliance criteria for R0-R2 (but not for R3 and R4), L3 may satisfy SAR compliance criteria for R0-R3 (but not for R4), and MIN may satisfy SAR compliance criteria for any of R0-R4. As shown in FIG. 9, the proximity regions R0-R4 may be defined by the capacitance measurements (C1$x$, C2$x$) derived from C1 and C2. Specifically, R0 may be defined by C1A<C1$x$<C1B and C2A<C2$x$<C2B, which may be denoted herein as R0=(C1$x$∈(C1A, C1B), C2$x$∈(C2A, C2B). The other regions may be defined as follows: R1= (C1$x$∈(C1B, C1C), C2$x$∈(C2C, C2E); R2=(C1$x$∈(C1C, C1D), C2$x$∈(C2B, C2D); R3=(C1$x$∈(C1D, C1F), C2$x$∈ (C2F, C2G); R4=(C1$x$∈(C1E, C1G), C2$x$∈(C2C, C2F). More than two capacitance sensor may be used and as result, the proximity regions may be defined by blocks in higher dimensional space (for example, cuboid in 3D space). From now on, two capacitance sensors configuration is used as an example.

In some embodiments, multiple capacitance sensors may be positioned at distributed locations on the wireless device to facilitate proximity detection. For instance, a capacitance measurement from C2 may be necessary to differentiate between R3 and R4 when C1E<C1$x$<C1F. Similarly, a capacitance measurement from C1 may be necessary to differentiate between R1 and R2 when C2C<C2$x$<C2D. As such, multiple capacitance sensors may enable more effective proximity detection.

Figure 10:
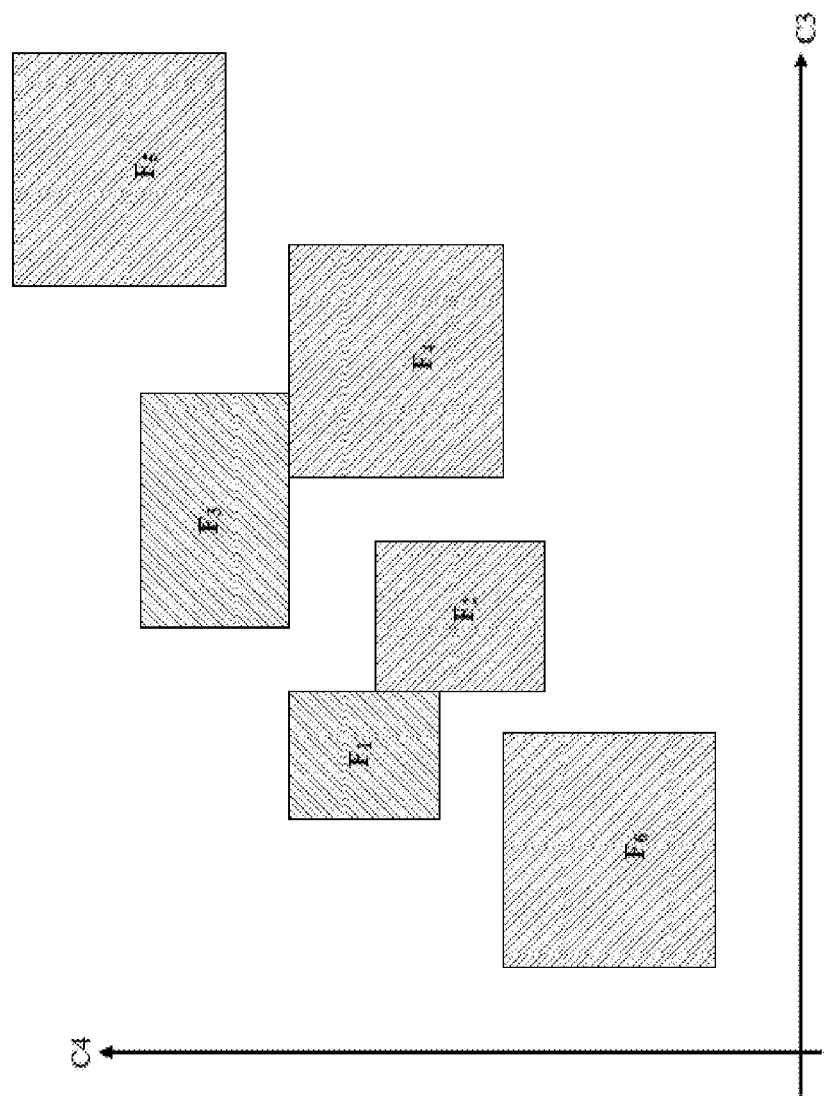
FIG. 10 illustrates another embodiment of a capacitance plane for classifying proximity regions.

SAR compliance testing may measure RF absorption rates by positioning a phantom (i.e., simulated human) at a specified separation distance (e.g., 5 mm) from a face of the wireless device, and subsequently detect/approximate the amount of RF radiation absorbed by the phantom. For some wireless device classifications, SAR compliance may require testing multiple faces (e.g., five faces) and/or various orientations/configurations (e.g., a USB dongle in various slots of a laptop, a wireless device on a tablet, etc.) of a wireless device. Accordingly, one strategy for satisfying SAR compliance may be to correlate the regions of proximity to the various faces of the device. FIG. 10 illustrates a capacitance plane 860 for determining when a human or phantom is in the proximity of a specific face of a wireless device based on data gathered from a third capacitance sensor (C3) and a fourth capacitance sensor (C4). The capacitance plane 860 may be similar to the capacitance plane 830, except that capacitance plane 860 may comprise proximity regions corresponding to the faces of the wireless device 700. The capacitance plane 860 may comprise a first proximity region (F1) corresponding to a bottom most face of the wireless device 700, a second proximity region (F2) corresponding to a top most face of the wireless device 700, a third proximity region (F3) corresponding to a front most face of the wireless device 700, a fourth proximity region (F4) corresponding to a rear most face of the wireless device 700, a fifth proximity region (F5) corresponding to a left-hand face of the wireless device 700, and a sixth proximity region (F6) corresponding to a right-hand face of the wireless device 700. Specifically, F1 may correspond to capacitance measurements for a phantom positioned a fixed distance (e.g., 5 mm) from the bottom most face while the wireless device is placed in various orientations (e.g., rotated, placed on a desk, etc.). Likewise, F2-F6 may correspond to similar capacitance measurements taken when the phantom is positioned near their respective faces and the wireless device is placed in various orientations. In some embodiments, the capacitance measurements may fluctuate within a given region (e.g., one of F1-F6) as the wireless device's orientation changes and the phantom's separation distance from the relevant face remains fixed. In other embodiments, the capacitance measurements may fluctuate within the region as the wireless device's orientation remains fixed and the phantom's separation distance from the relevant face varies. For instance, the separation distance may be incrementally increased from a specified starting distance (e.g., 5 mm) until the next level of power reduction satisfies SAR compliance criteria or until no power reduction is required to satisfy the SAR compliance criteria. In yet other embodiments, the capacitance measurements may fluctuate within the region as both the wireless device's orientation and the phantom's separation distance from the relevant face are varied. For instance, laboratory testing may be performed (as described below) for a variety of orientations, and regions may be defined according to a standard deviation or maximum/minimum value for the capacitance data obtained.

Accordingly, the capacitance values measure by C3 and C4 may be used to determine which face (if any) the human/phantom is proximately located to. This may allow thresholds to be set efficiently for the purpose of satisfying SAR compliance criteria, especially when an antenna is positioned closer to one face or another. For instance, the primary antenna 710 is positioned on the left-hand face of the wireless device 700, and consequently RF absorption rates may be higher for a human positioned proximately to the left-hand face than for a human positioned proximately to the right-hand face. As such, the output power limit associated with the left-hand face may be lower than the output power limit associated with the right-hand face. In some embodiments, the output power sent to both the primary antenna 710 and/or the secondary antenna 720 may be manipulated to maximize wireless performance while satisfying SAR compliance criteria. For instance, if a human is determined to be proximately located to the primary antenna, then throughput may be shifted to the secondary antenna (and vice-versa).

Figure 11:
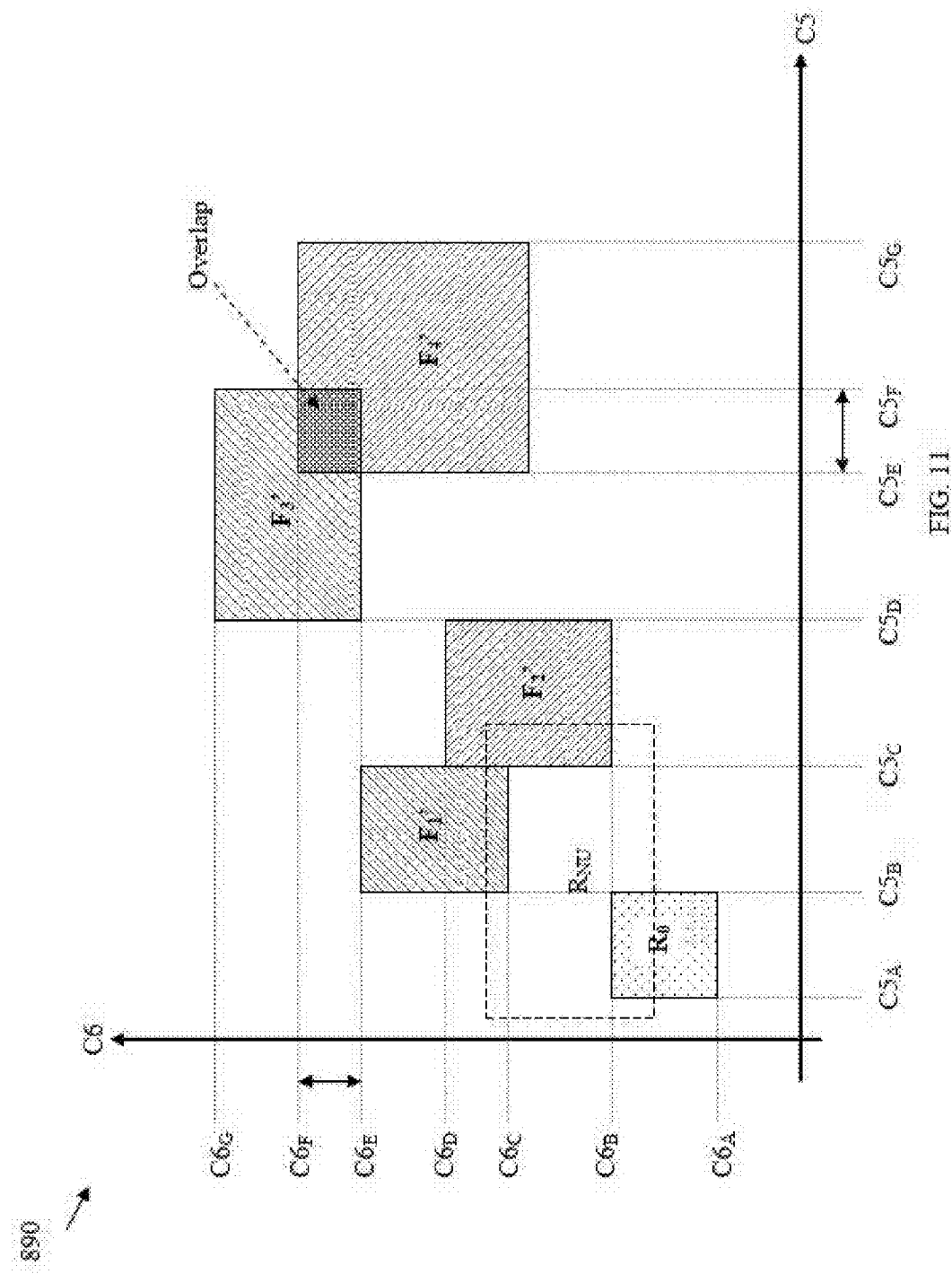
FIG. 11 illustrates another embodiment of a capacitance plane for classifying proximity regions.

In some embodiments, initial placement of one or more of the capacitance sensors may not be optimal. FIG. 11 illustrates a capacitance plane 890 that represents proximity data gathered from a fifth capacitance sensor (C5) and a sixth capacitance sensor (C6), which may be positioned at non-ideal and/or sub-optimal locations on a wireless device. The capacitance plane 890 may comprise a plurality of proximity regions, including F1'-F4' corresponding to four respective faces of a wireless device and R0' corresponding to a free space proximity region. F1'-F4' may be similar to F1-F4 in that they may comprise capacitance measurements for a phantom positioned proximately to their respective face. As shown in FIG. 11, R0', F1', and F2' may defined as R0'={(C5x∈(C5A, C5B), C6x∈(C6A, C6B)}; F1'={(C5x∈(C5B, C5C), C6x∈(C6C, C6E)}; and F2'={(C5x∈(C5C, C5D), C6x∈(C6B, C6D)}. However, portions of the F3' and F4' may overlap, making it difficult (or impossible) to determine which proximity region applies when the Fx={C5x∈(C5E, C5F), C6x∈(C6E, C6F)}. In such instances, it may be necessary or desirable to reposition the capacitance sensors C5 and C6 so that the proximity regions F3' and F4' no longer overlap, or alternatively to add an additional capacitance sensor (e.g., a third sensor), in which case a tri-axis proximity space may be defined.

In an embodiment, a normal usage region (RNU) may be defined in the capacitance plane 890. The RNU may correspond to or be defined by capacitance values measured when the wireless device is placed in normal operational configurations. For instance, an RNU for a wireless router may be defined by capacitance values measured while the wireless router is placed on a wooden desk, while an RNU for a data card with one dimensional (1D) rotation may be defined by capacitance values measured while the data card is rotated to a position close to a liquid crystal display (LCD). Ideally, RNU should not overlap with any of the proximity regions requiring power reduction (e.g., F1'-F4'), although it may not be all that important whether the RNU overlaps with the R0' because power reduction may not generally be required for free space. If there is a considerable overlapping of RNU with one or more of F1'-F4', relocation of the existing capacitance sensors (or the addition of another capacitance sensor) may be needed to avoid reducing wireless performance during normal use. Capacitance values that are not defined in RNU, R0, or F1'-F4' may be classified as RR. In some embodiments, the upper and lower capacitance values for one or more regions, as well as the corresponding output power limits (e.g., L1, L2, L3, etc.), may be stored in a static memory section of a wireless device or any of the other device discussed herein.

Figure 12:
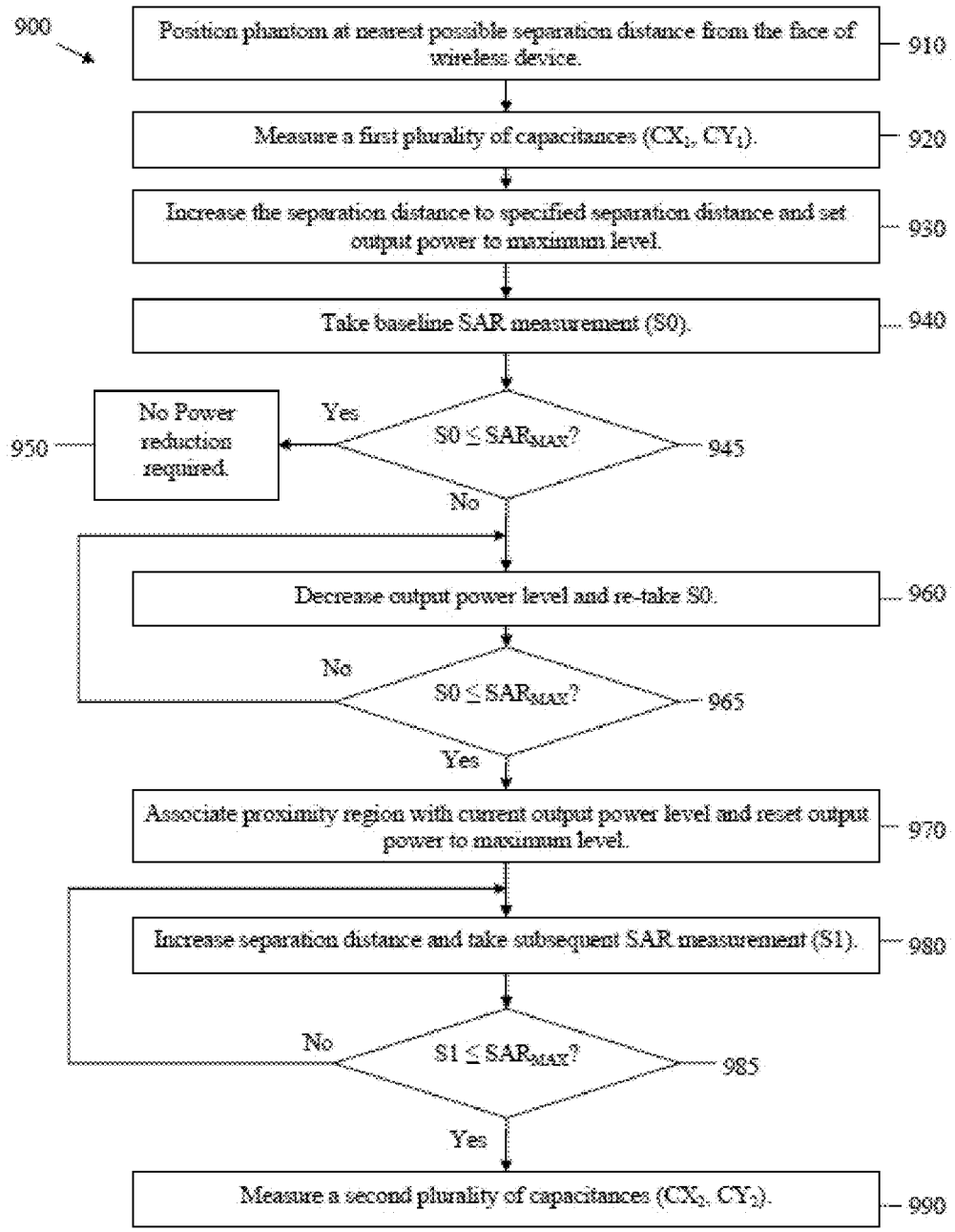
FIG. 12 illustrates a flowchart of an embodiment of a method for determining an appropriate output power limit to associate with a face of a wireless device.

Laboratory or development testing may be performed to define capacitance values for each face/proximity region, as well as to determine the appropriate output power limit for each face/proximity region. In some embodiments, the laboratory or development testing may follow SAR testing configuration (e.g., as outline by the FCC). FIG. 12 illustrates a flowchart of an embodiment of a method 900 for determining an appropriate output power limit to associate with a face of a wireless device. In an embodiment, the method 900 may be repeated for various configurations, and the data obtained may be statistically manipulated to obtain capacitance values, output power limit, or interrupt thresholds.

The method 900 may begin at block 910, where the phantom may be positioned at the nearest possible separation distance from the face of the wireless device. For instance, the phantom may be touching (or almost touching) the face of the wireless device. Subsequently, the method 900 may proceed to block 920, where a first plurality of capacitances (CX1, CY1) may be measured to determine a lower capacitance threshold for the region/face. Next, the method 900 may proceed to block 930, where the separation distance may be increased to a specified separation distance (e.g., as specified by the FCC), and the wireless device's output power may be set to a maximum level. The method 900 may then proceed to block 940, where a baseline SAR measurement (S0) may be taken. Next, the method 900 may proceed to block 945, where it may determine whether the S0 is less than or equal to the maximum RF exposure limit (SARMAX) as specified by the FCC (e.g., 1.6 W/kg for cell phones, etc.), or a valued based on the regulatory and customer requirement. If S0 is less than or equal to SARMAX, then the method 900 may determine that no power reduction is required for this proximity region end at block 950, and subsequently end. Otherwise (i.e., if S0>SARMAX), the method 900 may proceed to block 960, where the wireless device's output power may be decreased and S0 may be retaken.

The method 900 may proceed to block 965 after block 960, where it may once again determine whether S0 is less than or equal to SARMAX. If not (i.e., if S0>SARMAX), then the method 900 may loop between blocks 960 and 965 until it is determined that S0 is less than or equal to SARMAX at block 965. After determining that S0 is less than or equal to SARMAX at block 965 (e.g., after one or more iterations), the method 900 may proceed to block 970, where the current output power limit may be associated with the proximity region (e.g., R1 associated with L1), and the wireless device's output power may be reset to the maximum level. Subsequently, the method 900 may increase separation distance and take a subsequent SARMAX measurement (S1) at block 980. Next, the method 900 may decide whether S1 is less than or equal to SARMAX at block 985. If not (i.e., if S1>SARMAX), then the method 900 may loop between blocks 980 and 985 until S1 is less than or equal to SARMAX at block 985. After one or more iterations, the method 900 may determine that S1 is less than or equal to SARMAX at block 985, and then measure a second plurality of capacitances (CX2, CY2) at block 990. Subsequently, the method 900 may end.

Pursuant to data gathered by the method 900, a proximity region (Fn) corresponding to a face of the wireless device may be defined by as Fn={CX∈(CX1, CX2), CY∈(CY1, CY2)}. In an embodiment, the method 900 may be repeated for multiple device configurations, and Fn may be defined according to the obtained data. For instance, Fn may be defined by the highest and lowest capacitance values obtained, or by a standard deviation of capacitance values obtained.

Figure 13:
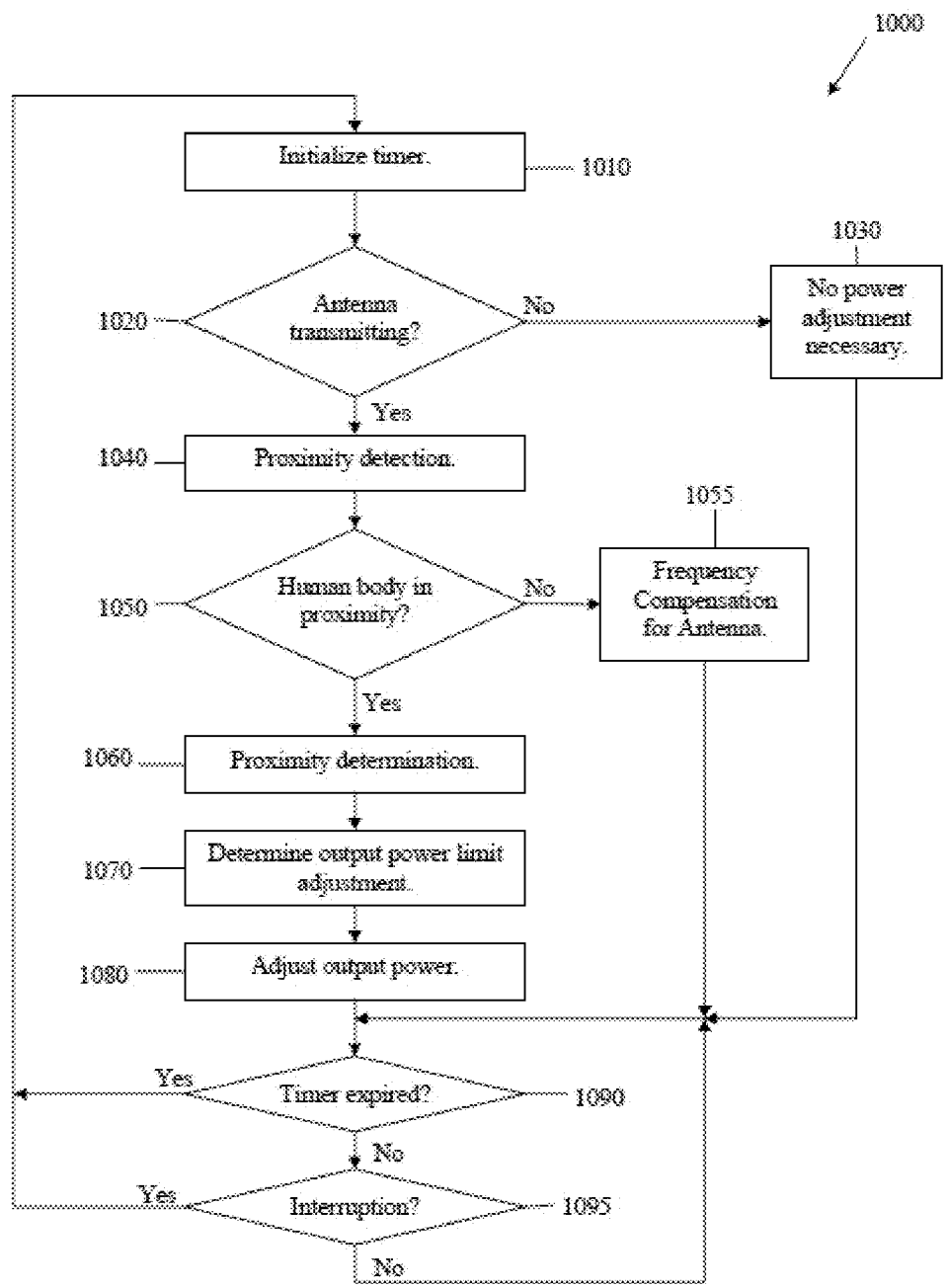
FIG. 13 illustrates a flowchart of an embodiment of a method for adjusting transceiver power to satisfy SAR compliance criteria.

FIG. 13 illustrates an embodiment of a method 1000 for adjusting transceiver power limit to satisfy SAR compliance criteria. In an embodiment, the method 1000 may be performed by a microprocessor (e.g., the baseband processor 130) based on information (e.g., digital signal, interrupts, etc.) provided by a capacitance sensing module (e.g., the CDC 160), an antenna detection module (e.g., the antenna detection module 140), an RF transceiver (e.g., the RF transceiver 120), or combinations thereof. The method 1000 may begin at block 1010, where a timer may be initiated. In an embodiment, the timer may determine the maximum period of time (i.e., absent an interrupt) between proximity determinations. The method may then proceed to block 1020, where the processor may determine whether the antenna is transmitting an RF signal based on information received from an antenna detection module/circuit. If not, the processor may determine that RF radiation is not being emitted. Thereafter, the method 1000 may proceed to block 1030, where the processor may determine that it is not necessary to adjust the output power limit of the RF transceiver. If at block 1020 it is determined that the antenna is transmitting an RF signal, the processor may determine that RF radiation is being emitted. Thereafter, the method may proceed to block 1040, where the processor may conduct proximity detection. In an embodiment, the proximity detection may be based off a digital signal received from a capacitance sensing module comprising capacitance data corresponding to the relative proximity of human body to the antenna.

The method 1000 may then proceed to block 1050, where the processor may determine whether or not a human body is in proximity to the antenna. If not, the processor may determine that the antenna's RF transmission satisfies SAR compliance criteria at the current/maximum power level. Thereafter, the method may proceed to block 1055 where the processor may perform frequency compensation on the RF transceiver and/or antenna to improve RF signal characteristics, e.g., reduce distortion, reduce noise, etc. If at block 1050 it is determined that a human body is in proximity to the antenna, then the method 1000 may then proceed to block 1060, where proximity determination may be performed. In an embodiment, the proximity determination may further analyze the capacitance data to determine a relative proximity of the human body to the antenna. For instance, the proximity determination may approximate a distance or identify a proximity region. Subsequently, the method 1000 may proceed to block 1070, where the processor may determine an appropriate amount to adjust the RF transceiver's power to meet SAR compliance and/or maximize wireless performance characteristics. Thereafter, the method may proceed to block 1080, where the processor may adjust the RF transceiver's output power based on the determination made in block 1070.

The method may then proceed to block 1090 after any one of blocks 1030, 1055, or 1080, where the processor may determine whether the timer has expired. If so, the method 1000 may proceed back to block 1010, where the aforementioned steps 1010-1080 may be repeated. If the timer has not expired, the method may proceed to block 1095, where the processor may check to see whether an interrupt has been received from the antenna detection module or capacitance sensing module. In an embodiment, an interrupt from the antenna detection module may be received if the antenna's status changes, e.g., if the antenna ends an RF transmission. In the same or other embodiments, an interrupt from the capacitance sensing module may be received when a capacitance sensor fluctuates greatly, or when it appears that a human has excited/entered a proximity region. If at block 1095 it is determined that an interrupt has been received, the method 1000 may proceed back to block 1010, where the aforementioned steps 1010-1080 may be repeated. Otherwise the method 1000 may proceed back to block 1090, where the loop between blocks 1090 and 1095 may continue until either the timer expires or an interruption is received.

Figure 14:
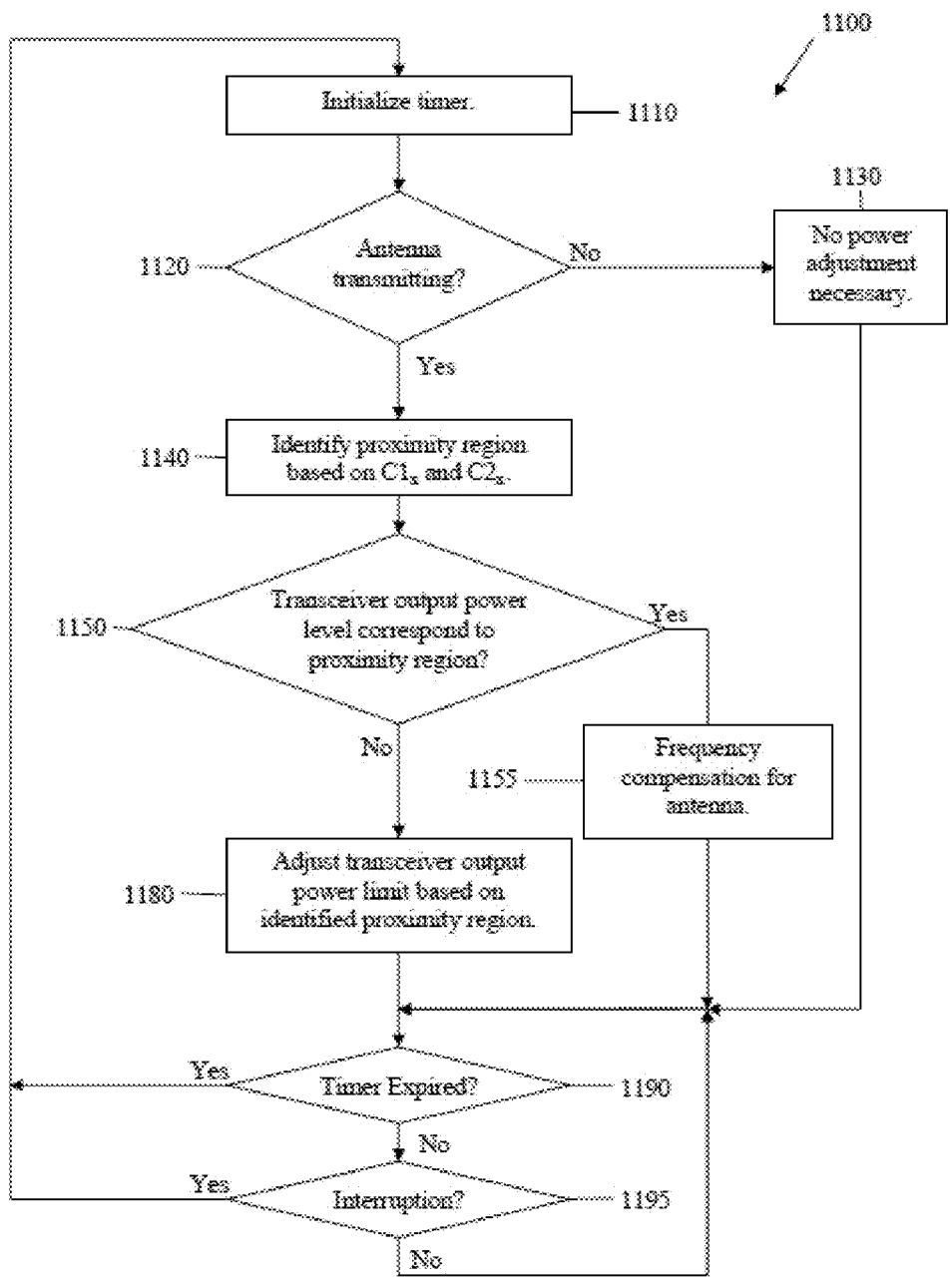
FIG. 14 illustrates a flowchart of another embodiment of a method for adjusting transceiver power to satisfy SAR compliance criteria.

FIG. 14 illustrates another embodiment of a method 1100 for adjusting transceiver power limit to satisfy SAR compliance criteria. In an embodiment, the method 1100 may be performed by a microprocessor (e.g., the baseband processor 130) based on information (e.g., digital signal, interrupts, etc.) provided by a capacitance sensing module (e.g., the CDC 160), an antenna detection module (e.g., the antenna detection module 140), an RF transceiver (e.g., the RF transceiver 120), or combinations thereof. The method 1100 may comprise blocks 1110-1190 shown in FIG. 14. In an embodiment, the blocks 1110-1130, 1155, and 1190-1195 may be substantially similar to the blocks 1010-1030, 1055, and 1090-1095 of the method 1000. Specifically, the method 1100 may initialize the timer at block 1110 and determine whether the antenna is transmitting at block 1120. If not, the method 1100 may determine that no power adjustment is needed at block 1130. If the antenna is transmitting, the method 1100 may proceed to block 1140, where the processor may identify the proximity region based on capacitance data (e.g., C1$x$, C2$x$) measured by two or more capacitance sensors. In an embodiment, the capacitance data may be communicated via a digital signal from a CDC. Subsequently, the method may proceed to block 1150, where the processor may determine whether the current RF transceiver's output power limit corresponds to the identified proximity region (e.g., R0=MAX, R1=L1, etc.). If so, then the method 1100 may proceed to block 1155, where the processor may (optionally) perform frequency compensation. If the transceiver's output power limit does not correspond to the identified proximity region, then the method 1100 may proceed to block 1180, where the processor may adjust the transceiver's output power limit to an appropriate level based on the identified proximity region. Subsequent to one of the blocks 1130, 1155, or 1180, the method 1100 may proceed to blocks 1190 and 1195, where the processor may determine whether the timer has expired or an interruption has been received.

Figure 15:
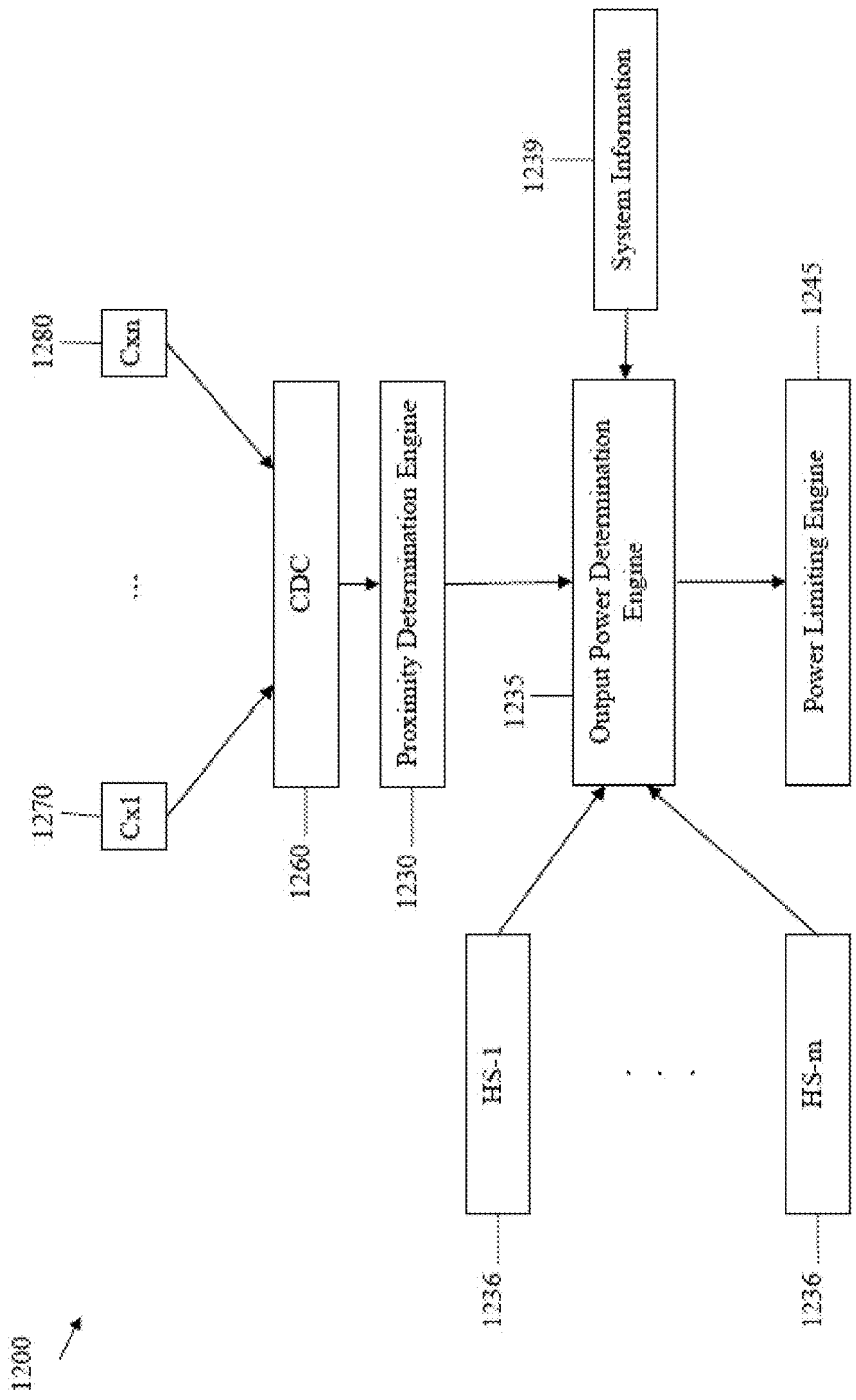
FIG. 15 illustrates a schematic diagram of an embodiment of a system for providing proximity detection in a wireless device.

FIG. 15 illustrates a schematic diagram of an embodiment of a system 1200 for providing proximity detection in a wireless device. The system 1200 may comprise a proximity detection engine 1230, an output power determination engine 1235, a plurality of hardware status modules 1236, a system information module 1239, a power limiting engine 1245, a CDC 1260, and a plurality of capacitance sensors 1270-1280 arranged as shown in FIG. 15. The proximity detection engine 1230 may be any hardware component, software implementation, or combination thereof that is configured to determine the proximity of human body in relation to a wireless device using one or more of the concepts described herein. The output power determination engine 1235 may be hardware component, software implementation, or combination thereof that is configured to make an output power determination based on one or more of the concepts described herein. The hardware status modules 1236 may be any hardware component configured to aid or facilitate in output power determination by the output power determination engine 1235, and may include at least a first hardware status module (HS-1) 1236, . . . and an mth hardware status module (HS-m) 1236 (where m is an integer greater than 1). The system information module 1239 may be any hardware component configured to provide system information to the output power determination engine 1235 for use during the output power determination. The CDC 1260 may be any device configured to convert capacitance data into a digital signal, and may be configured similarly to the CDC 160 discussed above. The capacitance sensors 1270-1280 may include at least a Cx1 1270, and an nth capacitance sensor Cx(n) 1280 (where n is an integer greater than 1), which may be configured similar to the Cx1 170 and the Cx2 180.

Figure 16:
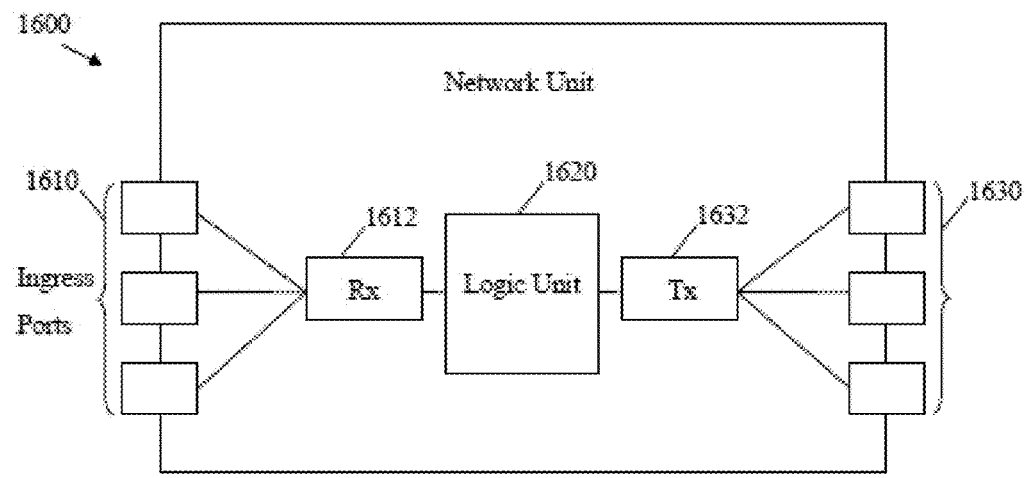
FIG. 16 illustrates a schematic diagram of an embodiment of a network unit for transporting data through a network.

FIG. 16 illustrates a schematic diagram of an embodiment of a network unit 1600 for transporting data through a network. The network unit 1600 may be any device that transports and processes data through a network. The network unit 1600 may comprise one or more ingress ports or units 1610 coupled to a receiver (Rx) 1612 for receiving signals and frames/data from other network components. The network unit 1600 may comprise a logic unit 1620 to determine which network components to send data to. The logic unit 1620 may be implemented using hardware, software, or both. The network unit 1600 may also comprise one or more egress ports or units 1630 coupled to a transmitter (Tx) 1632 for transmitting signals and frames/data to the other network components. The receiver 1612, logic unit 1620, and transmitter 1632 may also implement or support any of the methods discussed above.

Figure 17:
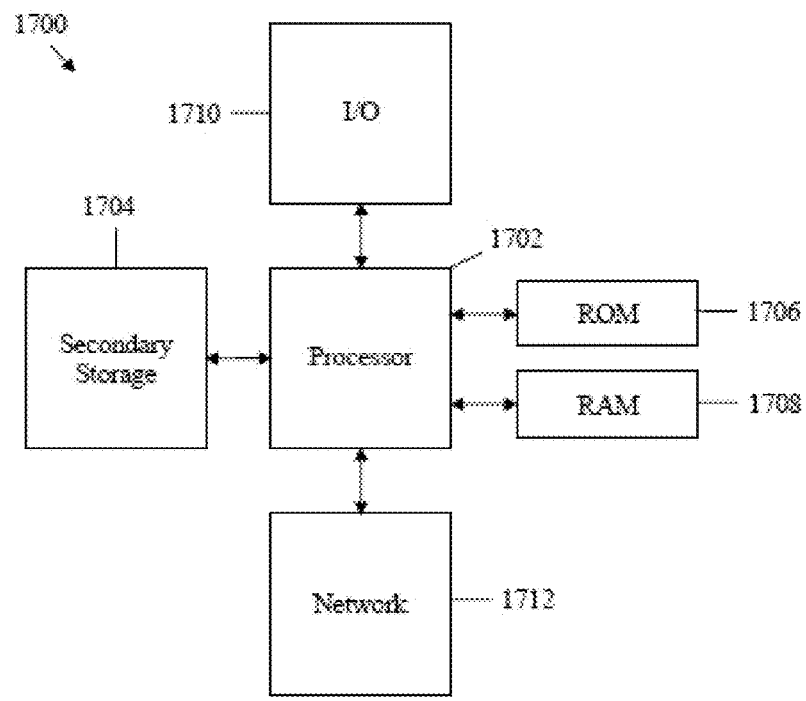
FIG. 17 illustrates a schematic diagram of an embodiment of a general-purpose network component.

The network components described above may be implemented on any general-purpose network component, such as a computer or network component with sufficient processing power, memory resources, and network throughput capability to handle the necessary workload placed upon it. FIG. 17 illustrates a schematic diagram of an embodiment of a general-purpose network component 1700. Specifically, the general-purpose network component 1700 may be suitable for implementing one or more embodiments of the components disclosed herein. The network component 1700 includes a processor 1702 (which may be referred to as a central processor unit or CPU) that is in communication with memory devices including secondary storage 1704, read only memory (ROM) 1706, random-access memory (RAM) 1708, input/output (I/O) devices 1710, and network connectivity devices 1712. The processor 1702 may be implemented as one or more CPU chips, or may be part of one or more application specific integrated circuits (ASICs).

The secondary storage 1704 is typically comprised of one or more disk drives or tape drives and is used for non-volatile storage of data and as an over-flow data storage device if RAM 1708 is not large enough to hold all working data. Secondary storage 1704 may be used to store programs that are loaded into RAM 1708 when such programs are selected for execution. The ROM 1706 is used to store instructions and perhaps data that are read during program execution. ROM 1706 is a non-volatile memory device that typically has a small memory capacity relative to the larger memory capacity of secondary storage 1704. The RAM 1708 is used to store volatile data and perhaps to store instructions. Access to both ROM 1706 and RAM 1708 is typically faster than to second storage 1704.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: $R=Rl+k*(Ru-Rl)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A wireless device for satisfying Specific Absorption Rate (SAR) compliance criteria, comprising:
   a first capacitance sensor;
   a second capacitance sensor, wherein an outer surface of the wireless device comprises a first face and a second face, the first capacitance sensor and the second capacitance sensor positioned at different faces of the outer surface; and
   a processor configured to:
   collect data from the first and the second capacitance sensors, the data related to a proximity between an object as a human body or a phantom of a simulated human body and the outer surface of the wireless device, wherein the proximity corresponds to a separation distance to the first face when the object is located proximately to the first face, wherein the proximity corresponds to a separation distance to the second face when the object is located proximately to the second face, wherein the first face is associated with a first range of separation distance to the first face, the first range associated with a first output power limit, wherein the second face is associated with a second range of separation distance to the second face, the second range associated with a second output power limit, and wherein the first range with the first output power limit and the second range with the second output power limit indicate a difference in output power limits between when the object is located proximately to the first face and when the object is located proximately to the second face,
   adjust a radio frequency (RF) transmitter output power limit of the wireless device to the first power limit satisfying the SAR compliance criteria when the separation distance to the first face is in the first range according to the data collected, and
   adjust the RF transmitter output power limit of the wireless device to the second power limit satisfying the SAR compliance criteria when the separation distance to the second face is in the second range according to the data collected.

2. The wireless device of claim 1, wherein the SAR compliance criteria relates to a rate of RF energy absorption per unit mass at a point in an absorbing body, determined by the formula:

$$SAR = \frac{\sigma \cdot E^2}{\rho}$$

where σ is a conductivity of tissue-simulating material in Siemens per meter (S/m), where E is a total root mean squared (RMS) electric field strength in volts per meter (V/m), and where ρ is a mass density of the tissue-simulating material in kilograms per cubic meter (kg/m³).

3. The wireless device according to claim 1, further comprising an antenna disposed closer to the first face than the second face, and wherein the first output power limit is lower than the second output power limit.

4. The wireless device of claim 1, wherein the first face is further associated with a third range of separation distance to the first face, the third range is next to the first range, the third range is associated with a third output power limit, the third output power limit is different from the first output power limit.

5. A method for a wireless device to satisfy Specific Absorption Rate (SAR) compliance criteria, comprising:
   collect data from a first capacitance sensor and a second capacitance sensor, the data related to a proximity between an object as a human body or a phantom of a simulated human body and an outer surface of the wireless device, wherein the outer surface of the wireless device comprises a first face and a second face, the two capacitance sensors positioned at different faces of the outer surface, wherein the proximity corresponds to a separation distance to the first face when the object is located proximately to the first face, wherein the proximity corresponds to a separation distance to the second face when the object is located proximately to the second face, wherein the first face is associated with a first range of separation distance to the first face, the first range associated with a first output power limit, wherein the second face is associated with a second range of separation distance to the second face, the second range associated with a second output power limit, and wherein the first range with the first output power limit and the second range with the second output power limit indicate a difference in output power limits between when the object is located proximately to the first face and when the object is located proximately to the second face;
   adjust a radio frequency (RF) transmitter output power limit of the wireless device to the first power limit satisfying the SAR compliance criteria, wherein the separation distance to the first face is in the first range according to the data collected; and
   adjust the RF transmitter output power limit of the wireless device to the second power limit satisfying the SAR compliance criteria, wherein the separation distance to the second face is in the second range according to the data collected.

6. The method of claim 5, wherein the SAR compliance criteria is determined by the formula:

$$SAR = \frac{\sigma \cdot E^2}{\rho}$$

where σ is a conductivity of tissue-simulating material in Siemens per meter (S/m), where E is a total root mean squared (RMS) electric field strength in volts per meter (V/m), and where ρ is a mass density of the tissue-simulating material in kilograms per cubic meter (kg/m³).

7. The method according to claim 5, wherein the wireless device comprises an antenna disposed closer to the first face than the second face, and wherein the first output power limit is lower than the second output power limit.

8. The method of claim 5, wherein the first face is further associated with a third range of separation distance to the first face, the third range is next to the first range, the third range is associated with a third output power limit, the third output power limit is different from the first output power limit.

* * * * *